(12) United States Patent
Kasahara et al.

(10) Patent No.: US 11,422,059 B2
(45) Date of Patent: Aug. 23, 2022

(54) OPTICAL INSPECTION DEVICE AND OPTICAL INSPECTION METHOD

(71) Applicant: HAMAMATSU PHOTONICS K.K., Hamamatsu (JP)

(72) Inventors: Takashi Kasahara, Hamamatsu (JP); Katsumi Shibayama, Hamamatsu (JP); Masaki Hirose, Hamamatsu (JP); Toshimitsu Kawai, Hamamatsu (JP); Hiroki Oyama, Hamamatsu (JP); Yumi Kuramoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/765,626

(22) PCT Filed: Nov. 9, 2018

(86) PCT No.: PCT/JP2018/041733
§ 371 (c)(1),
(2) Date: May 20, 2020

(87) PCT Pub. No.: WO2019/102879
PCT Pub. Date: May 31, 2019

(65) Prior Publication Data
US 2020/0278272 A1    Sep. 3, 2020

(30) Foreign Application Priority Data

Nov. 24, 2017 (JP) .............................. JP2017-226090

(51) Int. Cl.
*G01M 11/02* (2006.01)
*G01M 11/00* (2006.01)
*G02B 26/00* (2006.01)

(52) U.S. Cl.
CPC ...... *G01M 11/0285* (2013.01); *G01M 11/005* (2013.01); *G01M 11/0214* (2013.01); *G02B 26/001* (2013.01)

(58) Field of Classification Search
CPC .......... G01M 11/0285; G01M 11/005; G01M 11/0214; G02B 26/001; G01J 3/26; G01J 3/0286; G01J 3/45; G01J 5/04; G01J 5/20
(Continued)

(56) References Cited

U.S. PATENT DOCUMENTS

| 5,550,373 A | * | 8/1996 | Cole | ................... | G02B 26/001 |
| | | | | | 356/519 |
| 2003/0132386 A1 | * | 7/2003 | Carr | ........................ | G01J 5/046 |
| | | | | | 250/338.1 |

(Continued)

FOREIGN PATENT DOCUMENTS

| CN | 103675977 A | 3/2014 |
| CN | 105705920 A | 6/2016 |

(Continued)

OTHER PUBLICATIONS

International Preliminary Report on Patentability dated Jun. 4, 2020 for PCT/JP2018/041733.

(Continued)

*Primary Examiner* — Isiaka O Akanbi
(74) *Attorney, Agent, or Firm* — Faegre Drinker Biddle & Reath LLP

(57) ABSTRACT

An optical inspection device includes: a wafer support unit configured to support a wafer in which a plurality of Fabry-Perot interference filter portions are formed, each of the plurality of filter portions in which a distance between the first mirror portion and the second mirror portion facing each other varies by an electrostatic force, the wafer support unit configured to support the wafer such that a direction in (Continued)

which the first mirror portion and the second mirror portion face each other follows along a reference line; a light emission unit configured to emit light to be incident on each of the plurality of filter portions along the reference line; and a light detection unit configured to detect light transmitted through each of the plurality of filter portions along the reference line. The wafer support unit has a light passage region that allows light to pass along the reference line.

10 Claims, 24 Drawing Sheets

(58) Field of Classification Search
USPC .................................................. 356/454, 519
See application file for complete search history.

(56) References Cited

U.S. PATENT DOCUMENTS

| | | |
|---|---|---|
| 2004/0255853 A1 | 12/2004 | Ma et al. |
| 2006/0215147 A1 | 9/2006 | Scott et al. |
| 2009/0040616 A1* | 2/2009 | Lin ........................... G01J 3/02 |
| | | 359/579 |
| 2010/0046002 A1 | 2/2010 | Perez et al. |
| 2012/0109584 A1* | 5/2012 | Urushidani ............... G01J 3/12 |
| | | 702/189 |
| 2012/0181647 A1* | 7/2012 | Blomberg .................. G01J 3/02 |
| | | 257/432 |
| 2016/0245697 A1* | 8/2016 | Shibayama ........... G01J 3/0286 |
| 2016/0282181 A1* | 9/2016 | Shibayama ........... G01J 3/0286 |
| 2016/0357009 A1* | 12/2016 | Shibayama ............... G01J 3/26 |
| 2016/0370573 A1 | 12/2016 | Shibayama et al. |
| 2018/0113024 A1* | 4/2018 | Hirose .................. G01J 5/0862 |
| 2018/0128682 A1* | 5/2018 | Nissim ...................... G01J 3/45 |
| 2018/0188110 A1* | 7/2018 | Goldring ............... G01J 3/0213 |

FOREIGN PATENT DOCUMENTS

| | | |
|---|---|---|
| CN | 105992964 A | 10/2016 |
| JP | S63-179540 A | 7/1988 |
| JP | H04-016735 A | 1/1992 |
| JP | H4-035846 A | 2/1992 |
| JP | H10-135291 A | 5/1998 |
| JP | 2000-028931 A | 1/2000 |
| JP | 2004-101478 A | 4/2004 |
| JP | 2006-177954 A | 7/2006 |
| JP | 2013-506154 A | 2/2013 |
| JP | 2014-056073 A | 3/2014 |
| JP | 2015-152713 A | 8/2015 |
| JP | 2016-211860 A | 12/2016 |
| JP | 2017-226092 A | 12/2017 |
| TW | 201725367 A | 7/2017 |
| WO | WO-2011/036346 A1 | 3/2011 |
| WO | WO-2016/107973 A1 | 7/2016 |

OTHER PUBLICATIONS

Persin et al., "Effect of thermal treatment on the characteristics of interference Fabry-Perot filters", Thin Solid Films, Elsevier, Amsterdam, NL, vol. 3, No. 6, 1969, p. 387-p. 394, XP024500712.

* cited by examiner

Fig.20
(a)
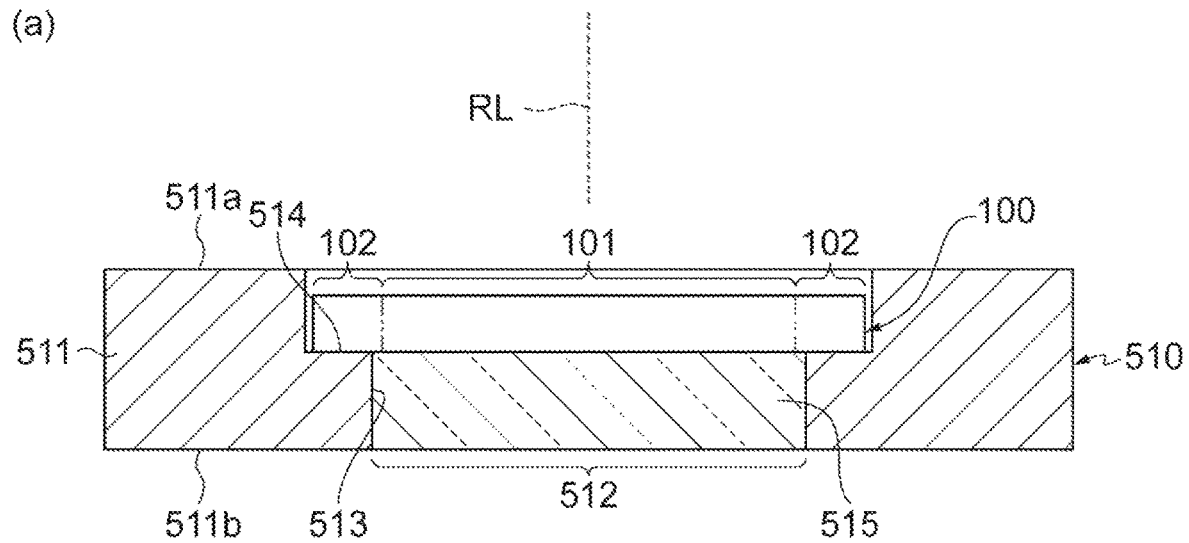
(b)
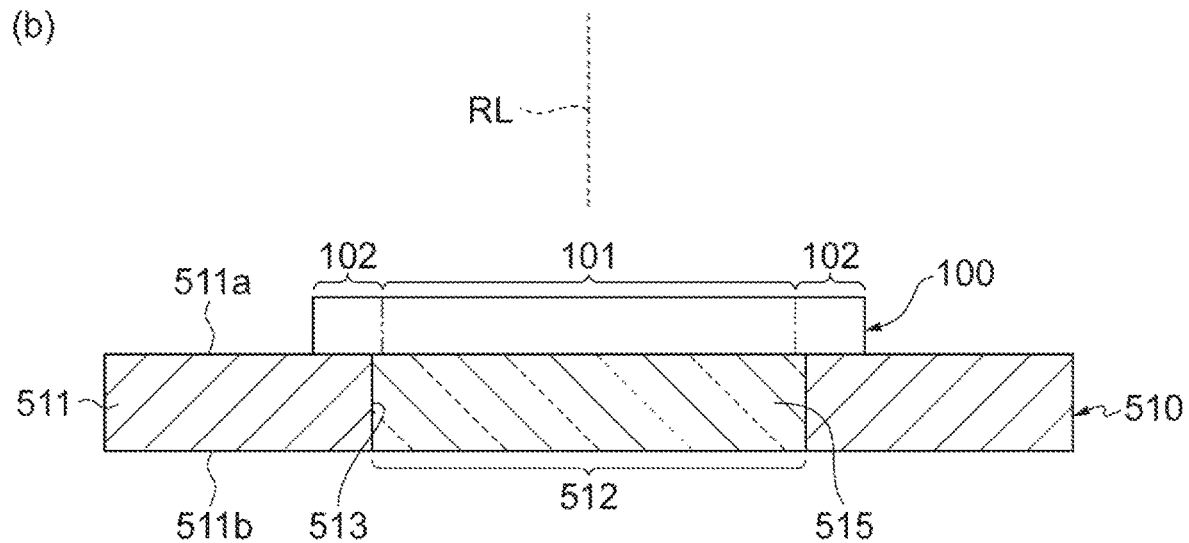

ОPTICAL INSPECTION DEVICE AND
OPTICAL INSPECTION METHOD

TECHNICAL FIELD

The present disclosure relates to an optical inspection device and an optical inspection method for obtaining a Fabry-Perot interference filter.

BACKGROUND ART

In the related art, a Fabry-Perot interference filter including a substrate, a fixed mirror and a movable mirror facing each other via a gap on the substrate is known (for example, refer to Patent Literature 1).

CITATION LIST

Patent Literature

Patent Literature 1: Japanese Unexamined Patent Publication No. 2013-506154

SUMMARY OF INVENTION

Technical Problem

Since a Fabry-Perot interference filter as described above is a fine structure, it is difficult to improve both manufacturing efficiency and a yield when a Fabry-Perot interference filter is manufactured.

Therefore, the present disclosure aims to provide an optical inspection device and an optical inspection method capable of obtaining a plurality of Fabry-Perot interference filters with high efficiency and high yield.

Solution to Problem

An optical inspection device according to one aspect of the present disclosure includes: a wafer support unit configured to support a wafer including a substrate layer and a plurality of pairs two-dimensionally arranged on the substrate layer, each of the plurality of pairs having a first mirror portions and a second mirror portion, a plurality of Fabry-Perot interference filter portions being formed in the wafer, each of the plurality of Fabry-Perot interference filter portions in which a gap is formed between the first mirror portion and the second mirror portion facing each other and a distance between the first mirror portion and the second mirror portion facing each other varies by an electrostatic force, the wafer support unit configured to support the wafer such that a direction in which the first mirror portion and the second mirror portion face each other follows along a reference line; a light emission unit configured to emit light to be incident on each of the plurality of Fabry-Perot interference filter portions along the reference line; and a light detection unit configured to detect light transmitted through each of the plurality of Fabry-Perot interference filter portions along the reference line, in which the wafer support unit has a light passage region through which light is allowed to pass along the reference line.

This optical inspection device inspects light transmission characteristics of a plurality of Fabry-Perot interference filter portions to be a plurality of Fabry-Perot interference filters, in a state of a wafer. This enables the optical inspection device to obtain a plurality of Fabry-Perot interference filters with high efficiency and with high yield. The reason is as follows. The Fabry-Perot interference filter is an element in which characteristics are likely to change during individual processes from being cut out from a wafer to being assembled onto a light detection device, for example. Therefore, inspection of the characteristics of the Fabry-Perot interference filter is considered to be necessary during the final assembly. On the other hand, the present inventors have found that the Fabry-Perot interference filter portion once being a non-faulty product in the state of wafer is unlikely to be a faulty Fabry-Perot interference filter even with a subsequent change in characteristics. Therefore, by inspecting the light transmission characteristics of each of Fabry-Perot interference filter portions in the state of wafer, it is possible to increase the probability of bringing a non-faulty Fabry-Perot interference filter to the final assembly stage while eliminating the waste that the Fabry-Perot interference filter that is faulty in the state of wafer is brought to the final assembly stage.

In addition, this optical inspection device enables inspection of the light transmission characteristics of each of Fabry-Perot interference filter portions with high efficiency and high accuracy. The reason is as follows. In a Fabry-Perot interference filter, the wavelength of transmitted light changes depending on the incident angle. Therefore, in order to inspect the light transmission characteristics of each of Fabry-Perot interference filters, it would be necessary to adjust the support angle for each of the Fabry-Perot interference filters. By inspecting the light transmission characteristics of each of Fabry-Perot interference filter portions in the state of wafer, the burden of such adjustment can be reduced. Furthermore, the wavelength of light transmitted through the Fabry-Perot interference filter changes depending on environmental conditions such as temperature. Therefore, when the light transmission characteristics are inspected for each of Fabry-Perot interference filters, the environmental conditions being the basis of inspection results are likely to vary between individual Fabry-Perot interference filters. By inspecting the light transmission characteristics of each of Fabry-Perot interference filter portions in the state of wafer, inspection results can be obtained under stable environmental conditions.

In the optical inspection device according to one aspect of the present disclosure, the wafer support unit may have an opening as the light passage region facing an effective area of the wafer, the plurality of Fabry-Perot interference filter portions are formed in the effective area. With this configuration, it is possible to transmit light along the reference line to each of Fabry-Perot interference filter portions of the wafer supported by the wafer support unit while simplifying the configuration of the wafer support unit.

In the optical inspection device according to one aspect of the present disclosure, the wafer support unit may have a light transmitting member as the light passage region, the light transmitting member comes in contact with an effective area of the wafer, the plurality of Fabry-Perot interference filter portions are formed in the effective area. With this configuration, it is possible to transmit light along the reference line to each of Fabry-Perot interference filter portions of the wafer supported by the wafer support unit while suppressing the warpage of the wafer.

An optical inspection device according to one aspect of the present disclosure may further include a voltage application unit configured to apply a voltage to each of the plurality of Fabry-Perot interference filter portions so as to change the distance between the first mirror portion and the second mirror portion facing each other. With this configuration, it is possible to obtain a relationship between the level of the applied voltage and the wavelength of the transmitted light for each of Fabry-Perot interference filter portions.

In the optical inspection device according to one aspect of the present disclosure, the light emission unit may be configured to simultaneously emit light with a plurality of wavelengths, and the light detection unit may be configured to detect the light with the plurality of wavelengths, for each of the wavelengths. With this configuration, by changing the level of the voltage applied to the Fabry-Perot interference filter portion and thereby acquiring the wavelength at which the detection intensity of light reaches a peak at each of the voltages, it is possible to acquire the relationship between the level of the voltage applied and the wavelength of the transmitted light for each of the Fabry-Perot interference filter portions.

In the optical inspection device according to one aspect of the present disclosure, the light emission unit may be configured to emit light with a plurality of wavelengths, for each of the wavelengths, and the light detection unit may be configured to have sensitivity to the light with the plurality of wavelengths. With this configuration, by changing the wavelength of the light to be emitted to change the level of the voltage applied to the Fabry-Perot interference filter portion at each of the wavelengths and thereby acquiring the voltage at which the detection intensity of light reaches a peak, it is possible to acquire the relationship between the level of the voltage applied and the wavelength of the transmitted light for each of the Fabry-Perot interference filter portions. Alternatively, by changing the level of the voltage applied to the Fabry-Perot interference filter portion to change the wavelength of light to be emitted at each of the voltages and thereby acquiring the wavelength at which the detection intensity of light reaches a peak at each of the voltages, it is possible to acquire the relationship between the level of the voltage applied and the wavelength of the transmitted light for each of the Fabry-Perot interference filter portions.

The optical inspection device according to one aspect of the present disclosure may further include an imaging unit configured to image the wafer supported by the wafer support unit. This makes it possible to acquire coordinate information of each of the Fabry-Perot interference filter portions and possible to position each of the Fabry-Perot interference filter portions on the reference line on the basis of the acquired coordinate information.

An optical inspection method according to one aspect of the present disclosure includes: a step of preparing a wafer including a substrate layer, and a plurality of pairs two-dimensionally arranged on the substrate layer, each of the plurality of pairs having a first mirror portion and a second mirror portion, a plurality of Fabry-Perot interference filter portions being formed in the wafer, each of the plurality of Fabry-Perot interference filter portions in which a gap is formed between the first mirror portion and the second mirror portion facing each other and a distance between the first mirror portion and the second mirror portion facing each other varies by an electrostatic force; a step of emitting light to be incident on each of the plurality of Fabry-Perot interference filter portions along a direction in which the first mirror portion and the second mirror portion face each other; and a step of detecting light transmitted through each of the plurality of Fabry-Perot interference filter portions along the direction in which the first mirror portion and the second mirror portion face each other.

This enables the optical inspection method to obtain a plurality of Fabry-Perot interference filters with high effi-ciency and with high yield for the reason similar to the case of the optical inspection device described above.

An optical inspection method according to one aspect of the present disclosure may further include a step of applying a voltage to each of the plurality of Fabry-Perot interference filter portions so as to change the distance between the first mirror portion and the second mirror portion facing each other. With this configuration, it is possible to obtain a relationship between the level of the applied voltage and the wavelength of the transmitted light for each of Fabry-Perot interference filter portions.

The optical inspection method according to one aspect of the present disclosure may further include a step of imaging a wafer. This makes it possible to acquire coordinate information of each of Fabry-Perot interference filter portions and possible to position each of the Fabry-Perot interference filter portions on the reference line on the basis of the acquired coordinate information in a case where light is to be incident on each of the Fabry-Perot interference filter portions along a reference line.

Advantageous Effects of Invention

According to the present disclosure, it is possible to provide an optical inspection device and an optical inspection method capable of obtaining a plurality of Fabry-Perot interference filters with high efficiency and high yield.

BRIEF DESCRIPTION OF DRAWINGS

FIG. 20 is a cross-sectional view of a modification of the wafer support unit of the optical inspection device according to the first to fifth embodiments.

DESCRIPTION OF EMBODIMENTS

Figure 1:
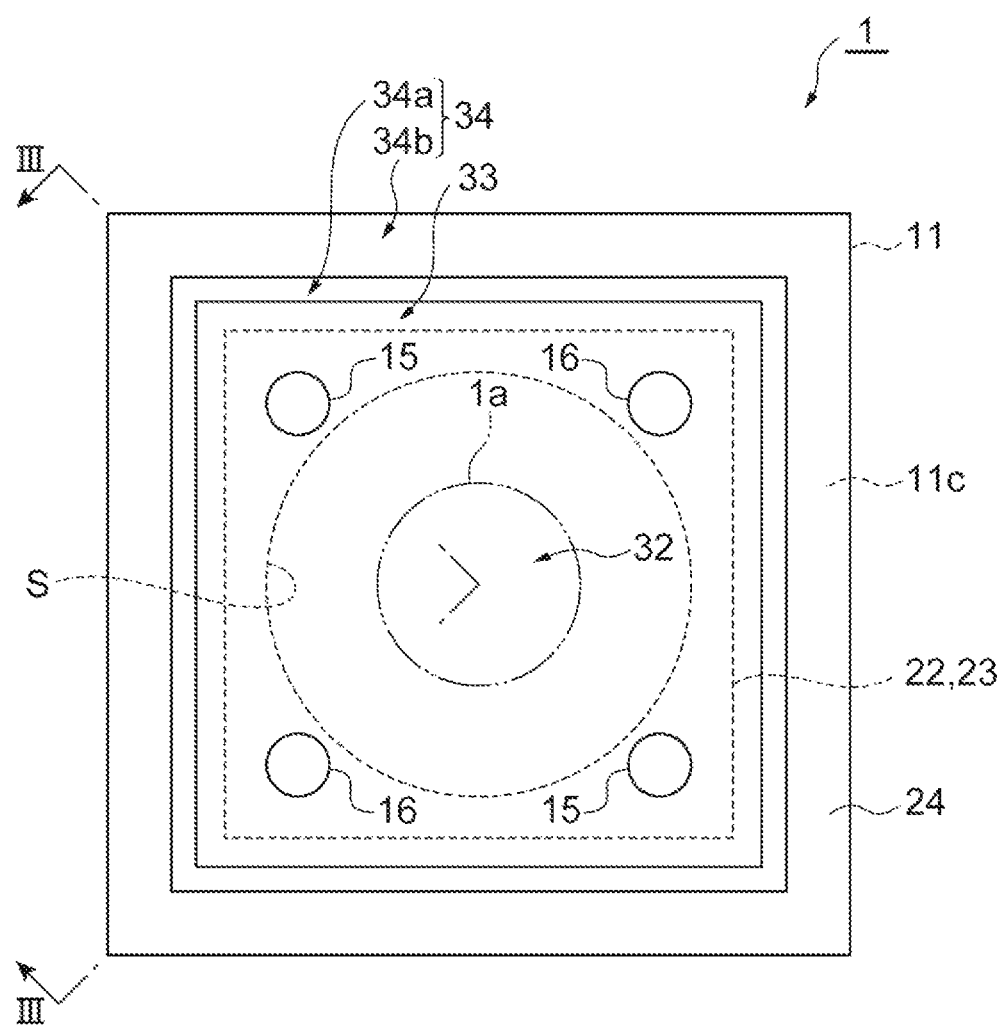
FIG. 1 is a plan view of a Fabry-Perot interference filter cut out from a wafer as an inspection target of an optical inspection device and an optical inspection method according to an embodiment.

Hereinafter, an embodiment of the present disclosure will be described in detail with reference to the drawings. In all the drawings, the same or equivalent portions are denoted with the same reference numerals and duplicated description is omitted.

[Configuration of Fabry-Perot Interference Filter and Dummy Filter]

Prior to the description of an optical inspection device and an optical inspection method according to an embodiment, configurations of a Fabry-Perot interference filter and a dummy filter cut out from a wafer as an inspection target will be described.

Figure 2:
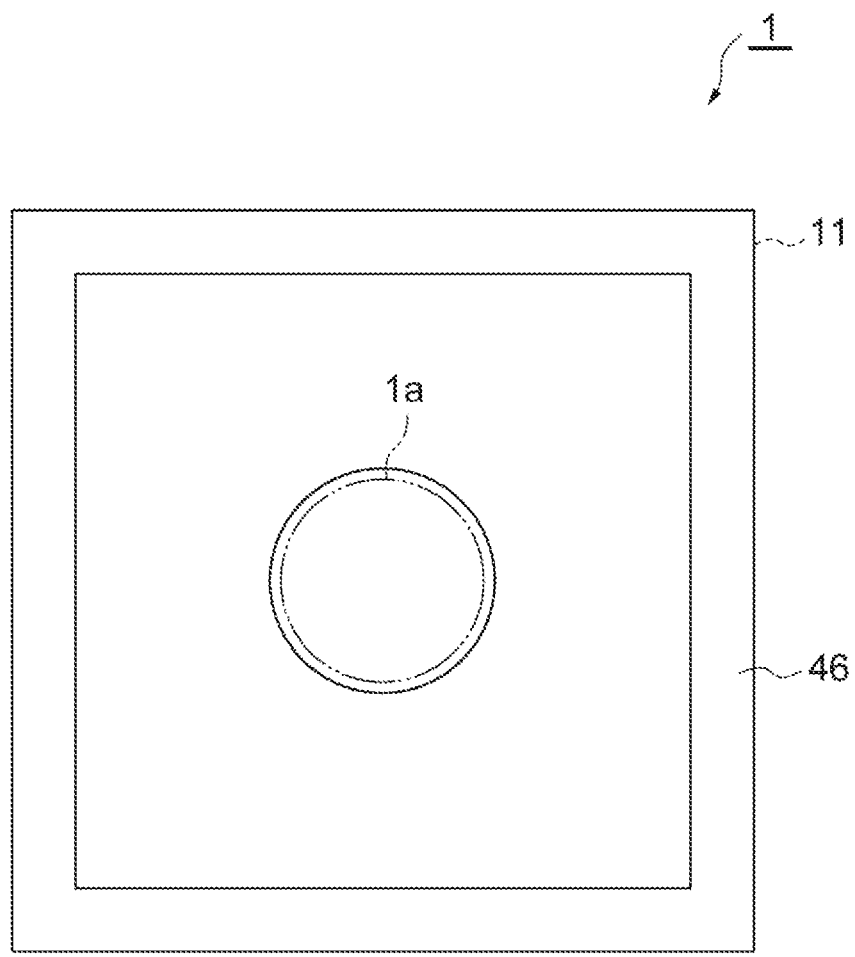
FIG. 2 is a bottom view of the Fabry-Perot interference filter illustrated in FIG. 1.
Figure 3:
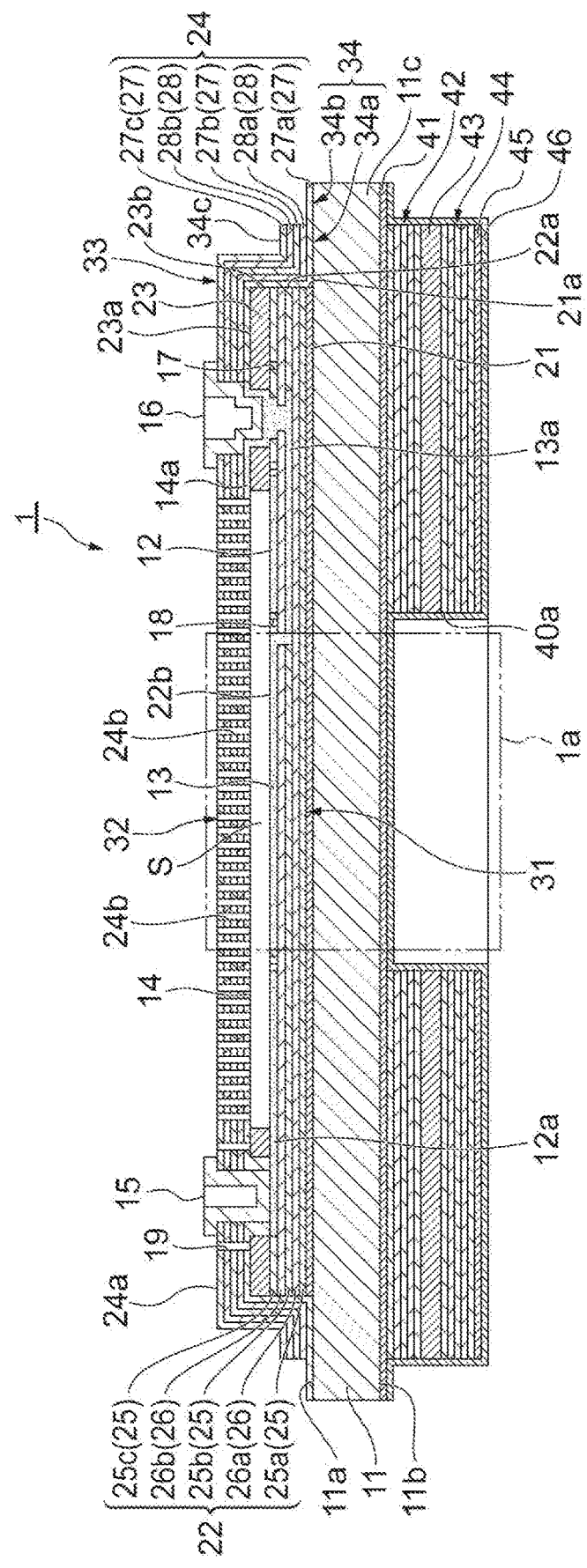
FIG. 3 is a cross-sectional view of the Fabry-Perot interference filter taken along line III-III in FIG. 1.

As illustrated in FIGS. 1, 2, and 3, a Fabry-Perot interference filter 1 includes a substrate 11. The substrate 11 has a first surface 11a and a second surface 11b opposite to the first surface 11a. On the first surface 11a, a reflection prevention layer 21, a first laminate 22, an intermediate layer 23, and a second laminate 24 are laminated in this order. A gap (air gap) S is defined between the first laminate 22 and the second laminate 24 by the frame-shaped intermediate layer 23.

The shape and the positional relationship of individual portions when viewed in a direction perpendicular to the first surface 11a (plan view) are as follows. For example, an outer edge of the substrate 11 has a rectangular shape. The outer edge of the substrate 11 and an outer edge of the second laminate 24 are aligned with each other. An outer edge of the reflection prevention layer 21, an outer edge of the first laminate 22, and an outer edge of the intermediate layer 23 are aligned with each other. The substrate 11 has an outer edge portion 11c positioned on an outer side of the outer edge of the intermediate layer 23 with respect to the center of the gap S. For example, the outer edge portion 11c has a frame shape and surrounds the intermediate layer 23 when viewed in a direction perpendicular to the first surface 11a. The gap S has a circular shape, for example.

The Fabry-Perot interference filter 1 transmits light having a predetermined wavelength through a light transmission region 1a defined in a center portion of the Fabry-Perot interference filter 1. The light transmission region 1a is a columnar region, for example. The substrate 11 is formed of silicon, quartz, or glass, for example. When the substrate 11 is formed of silicon, the reflection prevention layer 21 and the intermediate layer 23 are formed of silicon oxide, for example. The thickness of the intermediate layer 23 ranges from several tens of nm to several tens of μm, for example.

A portion corresponding to the light transmission region 1a in the first laminate 22 functions as a first mirror portion 31. The first mirror portion 31 is a fixed mirror. The first mirror portion 31 is disposed on the first surface 11a via the reflection prevention layer 21. The first laminate 22 includes alternate laminations of each of a plurality of polysilicon layers 25 and each of a plurality of silicon nitride layers 26. The Fabry-Perot interference filter 1 includes layers of a polysilicon layer 25a, a silicon nitride layer 26a, a polysilicon layer 25b, a silicon nitride layer 26b, and a polysilicon layer 25c laminated on the reflection prevention layer 21 in this order. The optical thickness of each of the polysilicon layers 25 and the silicon nitride layers 26 included in the first mirror portion 31 is preferably an integral multiple of ¼ of a center transmission wavelength. The first mirror portion 31 may be directly disposed on the first surface 11a without interposing the reflection prevention layer 21.

The portion corresponding to the light transmission region 1a in the second laminate 24 functions as a second mirror portion 32. The second mirror portion 32 is a movable mirror. The second mirror portion 32 faces the first mirror portion 31 via the gap S on a side opposite to the substrate 11 with respect to the first mirror portion 31. The direction in which the first mirror portion 31 and the second mirror portion 32 face each other is parallel to a direction perpendicular to the first surface 11a. The second laminate 24 is disposed on the first surface 11a via the reflection prevention layer 21, the first laminate 22, and the intermediate layer 23. The second laminate 24 includes alternate laminations of each of the plurality of polysilicon layers 27 and each of the plurality of silicon nitride layers 28. The Fabry-Perot interference filter 1 includes layers of a polysilicon layer 27a, a silicon nitride layer 28a, a polysilicon layer 27b, a silicon nitride layer 28b, and a polysilicon layer 27c laminated on the intermediate layer 23 in this order. The optical thickness of each of the polysilicon layer 27 and the silicon nitride layer 28 included in the second mirror portion 32 is preferably an integral multiple of ¼ of the center transmission wavelength.

In the first laminate 22 and the second laminate 24, silicon oxide layers may be used in place of the silicon nitride layers. In addition, examples of the material applicable for each of layers forming the first laminate 22 and the second laminate 24 include titanium oxide, tantalum oxide, zirconium oxide, magnesium fluoride, aluminum oxide, calcium fluoride, silicon, germanium, zinc sulfide, or the like. Here, the surface of the first mirror portion 31 on the gap S side (surface of the polysilicon layer 25c) and the surface of the second mirror portion 32 on the gap S side (surface of the polysilicon layer 27a) directly face each other via the gap S. Note that an electrode layer, a protective layer, or the like (not forming a mirror) may be formed on the surface of the first mirror portion 31 on the gap S side and on the surface of the second mirror portion 32 on the gap S side. In this case, the first mirror portion 31 and the second mirror portion 32 face each other via the gap S with the presence of these interposed layers. In other words, even in such a case, a facing configuration between the first mirror portion 31 and the second mirror portion 32 via the gap S can be achieved.

A plurality of through-holes 24b is formed at a portion of the second laminate 24 corresponding to the gap S (a portion overlapping the gap S when viewed in a direction perpendicular to the first surface 11a). Each of the through-holes 24b extends to reach the gap S from a surface 24a of the second laminate 24 opposite to the intermediate layer 23. The plurality of through-holes 24b is formed so as not to substantially influence the function of the second mirror portion 32. The plurality of through-holes 24b is used for forming the gap S by removing a portion of the intermediate layer 23 through etching.

In addition to the second mirror portion 32, the second laminate 24 further includes a covering portion 33 and a peripheral edge portion 34. The second mirror portion 32, the covering portion 33, and the peripheral edge portion 34 are integrally formed to have a portion of a same laminated structure and to be continuous to each other. The covering portion 33 surrounds the second mirror portion 32 when viewed in a direction perpendicular to the first surface 11a. The covering portion 33 covers a surface 23a of the intermediate layer 23 on a side opposite to the substrate 1, a side surface 23b of the intermediate layer 23 (a side surface on the outer side, that is, a side surface on a side opposite to the gap S side), a side surface 22a of the first laminate 22, and a side surface 21a of the reflection prevention layer 21, so as to reach the first surface 11a. That is, the covering portion 33 covers the outer edge of the intermediate layer 23, the outer edge of the first laminate 22, and the outer edge of the reflection prevention layer 21.

The peripheral edge portion 34 surrounds the covering portion 33 when viewed in a direction perpendicular to the first surface 11a. The peripheral edge portion 34 is positioned on the first surface 11a in the outer edge portion 11c. The outer edge of the peripheral edge portion 34 is aligned with the outer edge of the substrate 11 when viewed in a direction perpendicular to the first surface 11a. The peripheral edge portion 34 is thinned along an outer edge of the outer edge portion 11c. That is, the portion along the outer edge of the outer edge portion 11c in the peripheral edge portion 34 is thinner compared to other portions excluding the portion along the outer edge of the peripheral edge portion 34. In the Fabry-Perot interference filter 1, the peripheral edge portion 34 is thinned by removing a portion of the polysilicon layer 27 and the silicon nitride layer 28 included in the second laminate 24. The peripheral edge portion 34 includes a non-thinned portion 34a continuous to the covering portion 33, and a thinned portion 34b surrounding the non-thinned portion 34a. In the thinned portion 34b, the polysilicon layer 27 and the silicon nitride layer 28 are removed excluding the polysilicon layer 27a directly provided on the first surface 11a.

The height from the first surface 11a to a surface 34c of the non-thinned portion 34a on a side opposite to the substrate 11 is lower than the height from the first surface 11a to the surface 23a of the intermediate layer 23. The height from the first surface 11a to the surface 34c of the non-thinned portion 34a ranges from 100 nm to 5000 nm, for example. The height from the first surface 11a to the surface 23a of the intermediate layer 23 ranges from 500 nm to 20000 nm, for example. The width of the thinned portion 34b (distance between the outer edge of the non-thinned portion 34a and the outer edge of the outer edge portion 11c when viewed in the direction perpendicular to the first surface 11a) is 0.01 times the thickness of the substrate 11, or more. The width of the thinned portion 34b ranges from 5 μm to 400 μm, for example. The thickness of the substrate 11 ranges from 500 μm to 800 μm, for example.

A first electrode 12 is formed in the first mirror portion 31 so as to surround the light transmission region 1a when viewed in a direction perpendicular to the first surface 11a. The first electrode 12 is formed by doping impurities into the polysilicon layer 25c to achieve low resistivity. A second electrode 13 is formed in the first mirror portion 31 so as to include the light transmission region 1a when viewed in a direction perpendicular to the first surface 11a. The second electrode 13 is formed by doping impurities into the polysilicon layer 25c to achieve low resistivity. Note that although it is preferable that the second electrode 13 is sized to include the entire light transmission region 1a when viewed in a direction perpendicular to the first surface 11a, the second electrode 13 may have substantially the same size as that of the light transmission region 1a.

A third electrode 14 is formed in the second mirror portion 32. The third electrode 14 faces the first electrode 12 and the second electrode 13 via the gap S. The third electrode 14 is formed by doping impurities into the polysilicon layer 27a to achieve low resistivity.

A pair of terminals 15 are provided to face each other across the light transmission region 1a. Each of the terminals 15 is disposed inside a through-hole from the surface 24a of the second laminate 24 to the first laminate 22. Each of the terminals 15 is electrically connected to the first electrode 12 through wiring 12a. For example, each of the terminals 15 is formed with a metal film of aluminum, an alloy thereof, or the like.

A pair of terminals 16 are provided to face each other across the light transmission region 1a. Each of the terminals 16 is disposed inside a through-hole from the surface 24a of the second laminate 24 to the first laminate 22. Each of the terminals 16 is electrically connected to the second electrode 13 through wiring 13a and is electrically connected to the third electrode 14 through wiring 14a. For example, the terminals 16 are formed with a metal film of aluminum, an alloy thereof, or the like. The facing direction of the pair of terminals 15 and the facing direction of the pair of terminals 16 are orthogonal to each other (refer to FIG. 1).

A plurality of trenches 17 and 18 is provided on a surface 22b of the first laminate 22. The trench 17 annularly extends to surround a connection with respect to the terminals 16 in the wiring 13a. The trench 17 electrically insulates the first electrode 12 and the wiring 13a from each other. The trench 18 annularly extends along an inner edge of the first electrode 12. The trench 18 electrically insulates the first electrode 12 and an inner region of the first electrode 12 (second electrode 13) from each other. Each of the regions within the trenches 17 and 18 may be an insulating material or a gap.

A trench 19 is provided on the surface 24a of the second laminate 24. The trench 19 annularly extends to surround the terminals 15. The trench 19 electrically insulates the terminals 15 and the third electrode 14 from each other. The region inside the trench 19 may be an insulating material or a gap.

The second surface 11b of the substrate 11 includes layers of a reflection prevention layer 41, a third laminate 42, an intermediate layer 43, and a fourth laminate 44 laminated in this order. The reflection prevention layer 41 and the intermediate layer 43 each have a configuration similar to those of the reflection prevention layer 21 and the intermediate layer 23. The third laminate 42 and the fourth laminate 44 each have a laminated structure symmetrical to those of the first laminate 22 and the second laminate 24 with respect to the substrate 11. The reflection prevention layer 41, the third laminate 42, the intermediate layer 43, and the fourth laminate 44 have a function of suppressing warpage of the substrate 11.

The third laminate 42, the intermediate layer 43, and the fourth laminate 44 are thinned along the outer edge of the outer edge portion 11c. That is, the portion along the outer edge of the outer edge portion 11c in the third laminate 42, the intermediate layer 43, and the fourth laminate 44 is thinner compared to other portions excluding the portion along the outer edge in the third laminate 42, the intermediate layer 43, and the fourth laminate 44. In the Fabry-Perot interference filter 1, the third laminate 42, the intermediate layer 43, and the fourth laminate 44 are thinned by removing all of the third laminate 42, the intermediate layer 43, and the fourth laminate 44 in a portion overlapping the thinned portion 34b when viewed in a direction perpendicular to the first surface 11a.

The third laminate 42, the intermediate layer 43, and the fourth laminate 44 have an opening 40a so as to include the light transmission region 1a when viewed in a direction perpendicular to the first surface 11a. The opening 40a has a diameter substantially the same as the size of the light transmission region 1a. The opening 40a is open on the light emission side. The bottom surface of the opening 40a reaches the reflection prevention layer 41.

A light shielding layer 45 is formed on a surface of the fourth laminate 44 on the light emission side. For example, the light shielding layer 45 is formed of aluminum or the like. A protective layer 46 is formed on a surface of the light shielding layer 45 and an inner surface of the opening 40a. The protective layer 46 covers the outer edges of the third laminate 42, the intermediate layer 43, the fourth laminate 44, and the light shielding layer 45 and covers the reflection prevention layer 41 on the outer edge portion 11c. For example, the protective layer 46 is formed of aluminum oxide. An optical influence due to the protective layer 46 can be disregarded by forming the protective layer 46 in the thickness ranging from 1 nm to 100 nm (preferably, approximately 30 nm).

In the Fabry-Perot interference filter 1 configured as described above, when a voltage is applied between the first electrode 12 and the third electrode 14 via the pair of terminals 15 and 16, an electrostatic force corresponding to the voltage is generated between the first electrode 12 and the third electrode 14. The second mirror portion 32 is attracted to the first mirror portion 31 side secured to the substrate 11 by the electrostatic force, and the distance between the first mirror portion 31 and the second mirror portion 32 is adjusted. In this manner, in the Fabry-Perot interference filter 1, the distance between the first mirror portion 31 and the second mirror portion 32 changes by the electrostatic force.

The wavelength of light to be transmitted through the Fabry-Perot interference filter 1 depends on the distance between the first mirror portion 31 and the second mirror portion 32 in the light transmission region 1a. Therefore, the wavelength of light to be transmitted through the Fabry-Perot interference filter 1 can be appropriately selected by adjusting the voltage to be applied between the first electrode 12 and the third electrode 14. At this time, the second electrode 13 has the same potential as that of the third electrode 14. Therefore, the second electrode 13 functions as a compensation electrode to keep the first mirror portion 31 and the second mirror portion 32 flat in the light transmission region 1a.

In the Fabry-Perot interference filter 1, for example, a spectroscopic spectrum can be obtained by detecting light transmitted through the light transmission region 1a of the Fabry-Perot interference filter 1 using a light detector while changing the voltage to be applied to the Fabry-Perot interference filter 1 (that is, while changing the distance between the first mirror portion 31 and the second mirror portion 32 in the Fabry-Perot interference filter 1).

Figure 4:
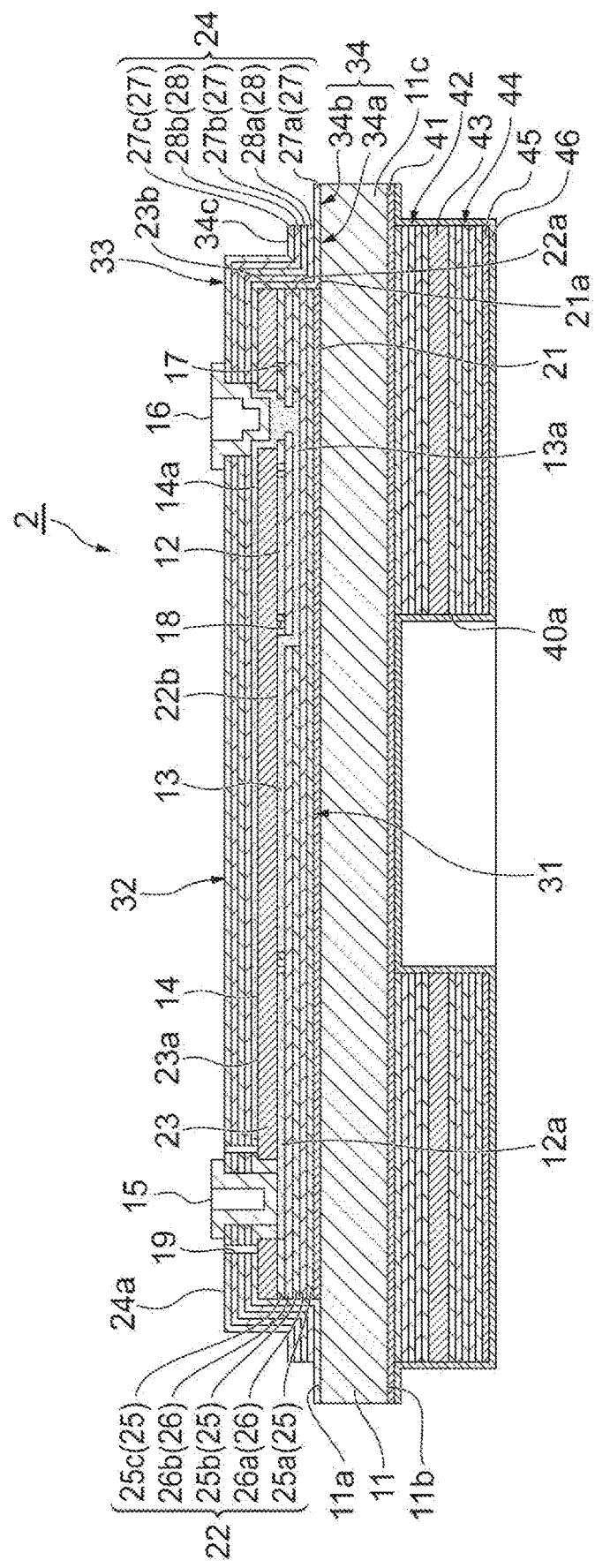
FIG. 4 is a cross-sectional view of a dummy filter cut out from a wafer as an inspection target of an optical inspection device and an optical inspection method according to an embodiment.

As illustrated in FIG. 4, the dummy filter 2 is different from the Fabry-Perot interference filter 1 described above in that the plurality of through-holes 24b is not formed in the second laminate 24 and the gap S is not formed in the intermediate layer 23. In the dummy filter 2, an intermediate layer 23 is provided between the first mirror portion 31 and the second mirror portion 32. That is, the second mirror portion 32 is disposed on the surface 23a of the intermediate layer 23, not floating above the gap S.

[Wafer Configuration]

Figure 5:
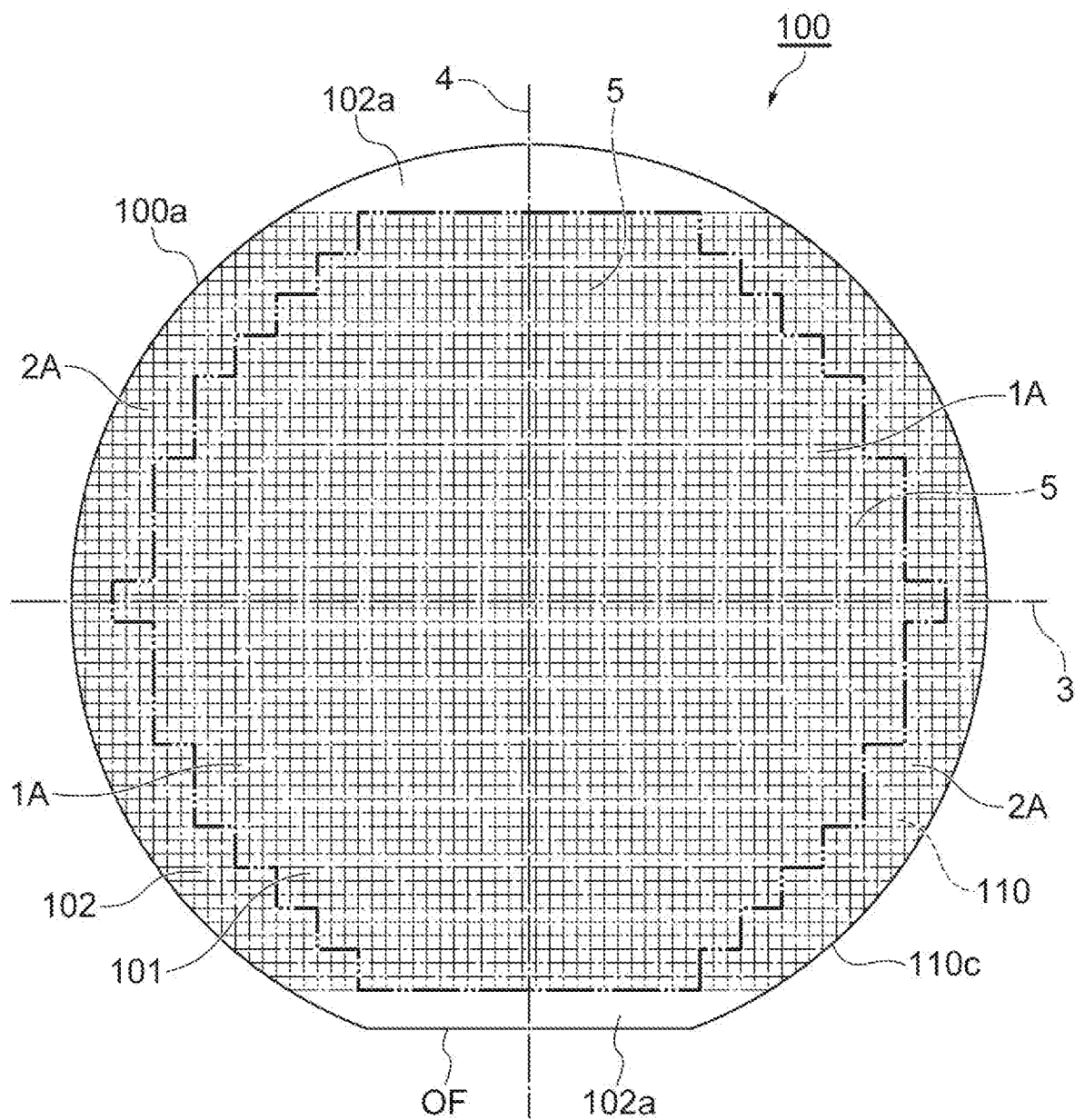
FIG. 5 is a plan view of a wafer as an inspection target of an optical inspection device and an optical inspection method according to an embodiment.
Figure 6:
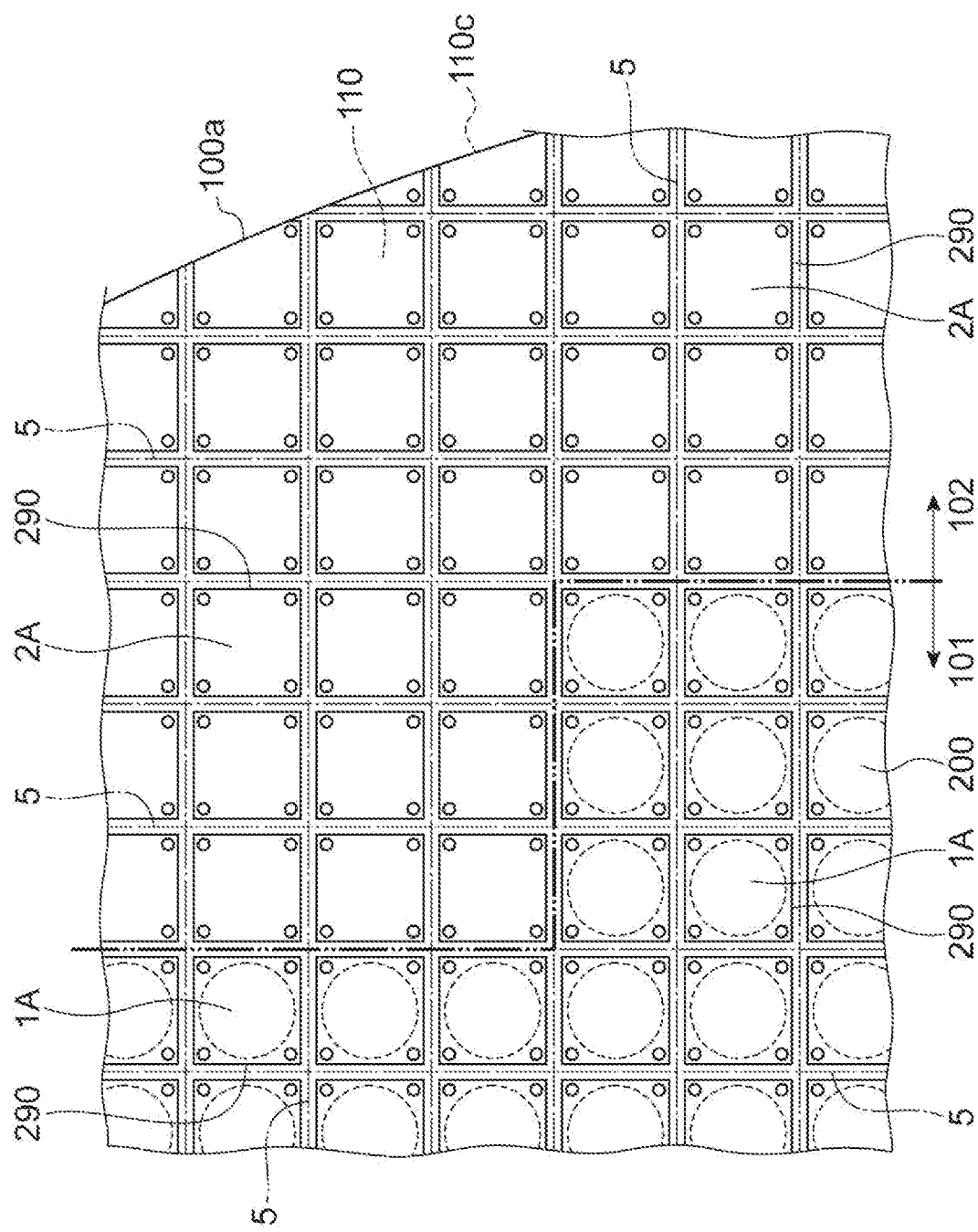
FIG. 6 is an enlarged plan view of a portion of the wafer illustrated in FIG. 5.

Next, a configuration of a wafer as an inspection target of an optical inspection device and an optical inspection method according to one embodiment will be described. As illustrated in FIGS. 5 and 6, a wafer 100 includes a substrate layer 110. The substrate layer 110 has a disk shape with an orientation flat OF formed in a portion of the substrate layer 110. For example, the substrate layer 110 is formed of silicon, quartz, glass, or the like. Hereinafter, a virtual straight line that passes through the center of the substrate layer 110 when viewed in the thickness direction of the substrate layer 110 and is parallel to the orientation flat OF is referred to as a first straight line 3, while a virtual straight line that passes through the center of the substrate layer 110 when viewed in the thickness direction of the substrate layer 110 and is perpendicular to the orientation flat OF is referred to as a second straight line 4.

The wafer 100 includes an effective area 101 and a dummy area 102. The dummy area 102 is an area along an outer edge 110c of the substrate layer 110 (that is, the outer edge 100a of the wafer 100). The effective area 101 is an area inside the dummy area 102. The dummy area 102 surrounds the effective area 101 when viewed in the thickness direction of the substrate layer 110. The dummy area 102 is adjacent to the effective area 101.

The effective area 101 includes a plurality of two-dimensionally arranged Fabry-Perot interference filter portions 1A. The plurality of Fabry-Perot interference filter portions 1A is provided in the entire effective area 101. The dummy area 102 includes a plurality of two-dimensionally arranged dummy filter portions 2A. The plurality of dummy filter portions 2A is provided in an area of the dummy area 102 excluding a pair of areas 102a. One area 102a is an area along the orientation flat OF. The other area 102a is an area along the portion of the outer edge 110c of the substrate layer 110 on an opposite side of the orientation flat OF. The Fabry-Perot interference filter portion 1A and the dummy filter portion 2A are adjacent to each other at a boundary between the effective area 101 and the dummy area 102. When viewed in the thickness direction of the substrate layer 110, the outer shape of the Fabry-Perot interference filter portion 1A and the outer shape of the dummy filter portion 2A are the same. The plurality of Fabry-Perot interference filter portions 1A and the plurality of dummy filter portions 2A are arranged so as to be symmetric about each of the first straight line 3 and the second straight line 4 orthogonal to each other. The plurality of dummy filter portions 2A may be provided over the entire dummy area 102. Furthermore, the plurality of dummy filter portions 2A may be provided in an area other than one of the areas 102a in the dummy areas 102.

Each of the plurality of Fabry-Perot interference filter portions 1A is to be each of a plurality of Fabry-Perot interference filters 1 when the wafer 100 is cut along each of lines 5. Each of the plurality of dummy filter portions 2A is to be each of a plurality of dummy filters 2 when the wafer 100 is cut along each of the lines 5. When viewed in the thickness direction of the substrate layer 110, the plurality of lines 5 extends in a direction parallel to the orientation flat OF, and the plurality of lines 5 extends in a direction perpendicular to the orientation flat OF. As an example, when each of the filter portions 1A and 2A has a rectangular shape when viewed in the thickness direction of the substrate layer 110, each of the filter portions 1A and 2A is arranged in a two-dimensional matrix, and the plurality of lines 5 is set in a lattice pattern so as to pass between adjacent filter portions 1A-1A, between adjacent filter portions 1A-2A, and between adjacent filter portions 2A-2A.

Figure 7:
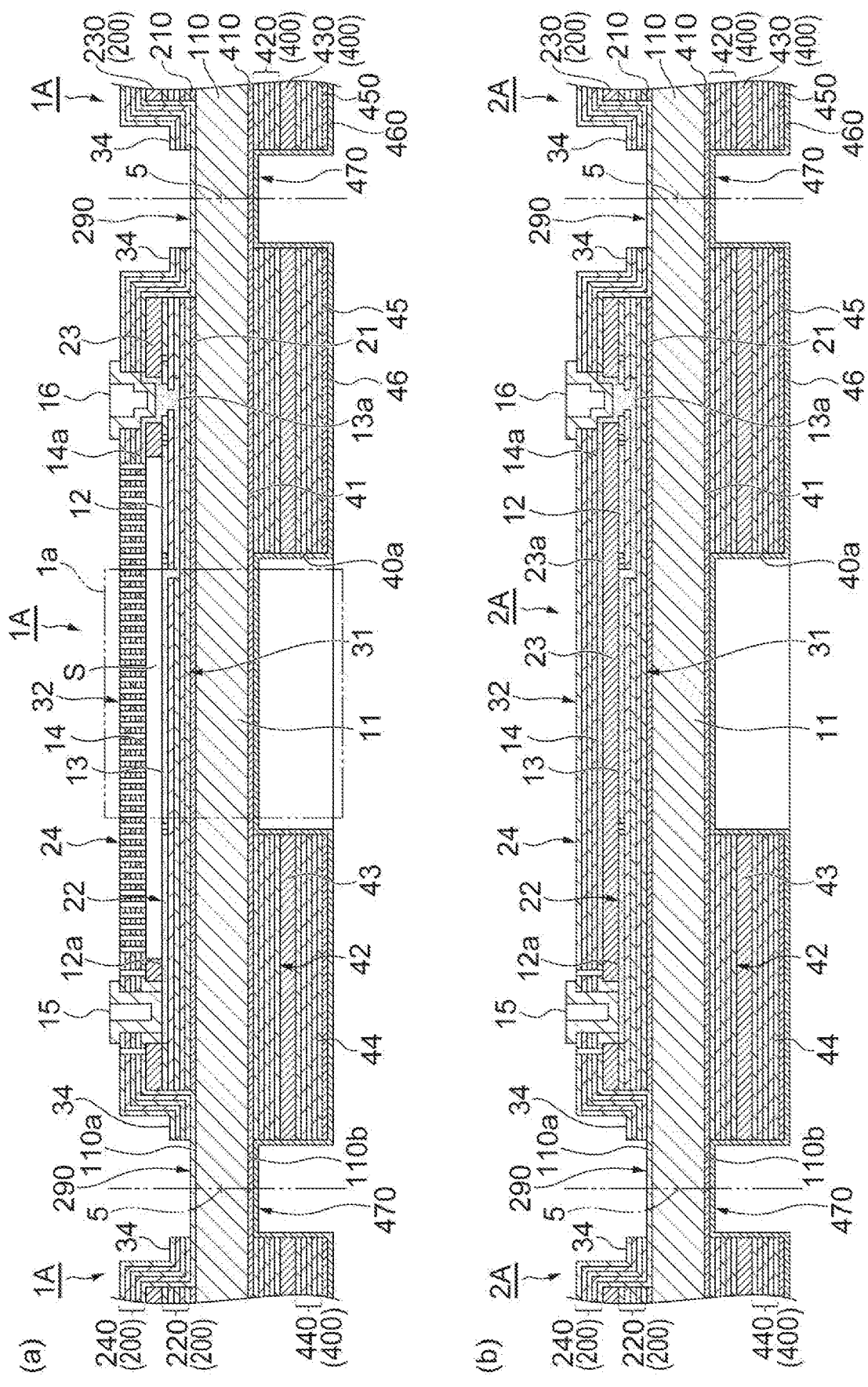
FIG. 7 is a cross-sectional view of a Fabry-Perot interference filter portion and a dummy filter portion of the wafer illustrated in FIG. 5.

(a) of FIG. 7 is a cross-sectional view of the Fabry-Perot interference filter portion 1A. (b) of FIG. 7 is a cross-sectional view of the dummy filter portion 2A. As illustrated in (a) and (b) of FIG. 7, the substrate layer 110 is a layer that is to be a plurality of substrates 11 when the wafer 100 is cut along each of the lines 5. The substrate layer 110 has a first surface 110a and a second surface 110b opposite to the first surface 110a. A reflection prevention layer 210 is provided on the first surface 110a of the substrate layer 110. The reflection prevention layer 210 is a layer to be a plurality of reflection prevention layers 21 when the wafer 100 is cut along each of the lines 5. A reflection prevention layer 410 is provided on the second surface 110b of the substrate layer 110. The reflection prevention layer 410 is a layer to be a plurality of reflection prevention layers 41 when the wafer 100 is cut along each of the lines 5.

A device layer 200 is provided on the reflection prevention layer 210. The device layer 200 includes a first mirror layer 220, an intermediate layer 230, and a second mirror layer 240. The first mirror layer 220 is a layer having a plurality of first mirror portions 31, and is a layer to be a plurality of first laminates 22 when the wafer 100 is cut along each of the lines 5. The plurality of first mirror portions 31 is two-dimensionally arranged on the first surface 110a of the substrate layer 110 via the reflection prevention layer 210. The intermediate layer 230 is a layer to be a plurality of intermediate layers 23 when the wafer 100 is cut along each of the lines 5. The second mirror layer 240 is a layer having a plurality of second mirror portions 32, and is a layer to be a plurality of second laminates 24 when the wafer 100 is cut along each of the lines 5. The plurality of second mirror portions 32 is two-dimensionally arranged on the first mirror layer 220 via the intermediate layer 23.

A stress adjustment layer 400 is provided on the reflection prevention layer 410. That is, the stress adjustment layer 400 is provided on the second surface 110b of the substrate layer 110 via the reflection prevention layer 410. The stress adjustment layer 400 includes a plurality of layers 420, 430, and 440. The layer 420 is a layer that is to be a plurality of third laminates 42 when the wafer 100 is cut along each of the lines 5. The layer 430 is a layer to be a plurality of intermediate layers 43 when the wafer 100 is cut along each of the lines 5. The layer 440 is a layer to be a plurality of fourth laminates 44 when the wafer 100 is cut along each of the lines 5.

A light shielding layer 450 and a protective layer 460 are provided on the stress adjustment layer 400. The light shielding layer 450 is a layer that is to be a plurality of light shielding layers 45 when the wafer 100 is cut along each of the lines 5. The protective layer 460 is a layer that is to be a plurality of protective layers 46 when the wafer 100 is cut along each of the lines 5.

As illustrated in (a) of FIG. 7, each of the Fabry-Perot interference filter portions 1A has a gap S formed between the first mirror portion 31 and the second mirror portion 32 facing each other. That is, in each of the Fabry-Perot interference filter portions 1A, the intermediate layer 23 defines the gap S, and the second mirror portion 32 floats on the gap S. Similarly to the configuration of the Fabry-Perot interference filter 1 described above, each of the Fabry-Perot interference filter portions 1A includes a configuration related to the first electrode 12, the second electrode 13, the third electrode 14, the plurality of terminals 15 and 16, the opening 40a, and the like. Therefore, even when the plurality of Fabry-Perot interference filter portions 1A is still in the state of the wafer 100, applying a voltage to each of the Fabry-Perot interference filter portions 1A via the pair of terminals 15 and 16 would change the distance between the first mirror portion 31 and the second mirror portion 32 facing each other due to the electrostatic force.

As illustrated in (b) of FIG. 7, each of the dummy filter portions 2A includes the intermediate layer 23 provided between the first mirror portion 31 and the second mirror portion 32 facing each other. That is, in the dummy filter portion 2A, the intermediate layer 23 does not define the gap S, and the second mirror portion 32 is disposed on the surface 23a of the intermediate layer 23. Accordingly, although each of the dummy filter portions 2A has a configuration related to the first electrode 12, the second electrode 13, the third electrode 14, the plurality of terminals 15 and 16, the openings 40a, and the like, similarly to the configuration of the dummy filter 2 described above, the distance between the first mirror portion 31 and the second mirror portion 32 facing each other would not change. Note that each of the dummy filter portions 2A does not need to include the configuration related to the first electrode 12, the second electrode 13, the third electrode 14, the plurality of terminals 15 and 16 (a metal film such as aluminum to form each of the terminal 15 and 16, through-holes for disposing each of the terminals 15 and 16, and the like), the opening 40a, and the like.

As illustrated in FIG. 6 and (a) of FIG. 7, the device layer 200 has a first groove 290 opening on the side opposite to the substrate layer 110. The first groove 290 is formed along each of the lines 5. The first groove 290 surrounds the first mirror portion 31, the intermediate layer 23, and the second mirror portion 32 in each of the Fabry-Perot interference filter portions 1A and each of the dummy filter portions 2A. In each of the Fabry-Perot interference filter portions 1A, the first mirror portion 31, the intermediate layer 23, and the second mirror portion 32 are surrounded by the annularly continuous first groove 290. Similarly, in each of the dummy filter portions 2A, the first mirror portion 31, the intermediate layer 23, and the second mirror portion 32 are surrounded by the annularly continuous first groove 290. Focusing on the adjacent filter portions 1A-1A, the adjacent filter portions 1A-2A, and the adjacent filter portions 2A-2A, the first groove 290 corresponds to a region on a peripheral edge portion 34 of one filter portion and a peripheral edge portion 34 of the other filter portion. The first groove 290 is continuous through the effective area 101 and the dummy area 102, and reaches the outer edge 110c of the substrate layer 110 when viewed in a direction in which the first mirror portion 31 and the second mirror portion 32 face each other (hereinafter, simply referred to as a "facing direction"). It is sufficient as long as the first groove 290 surrounds at least the second mirror portion 32 in each of the Fabry-Perot interference filter portions 1A and each of the dummy filter portions 2A.

As illustrated in (b) of FIG. 7, the stress adjustment layer 400 has a second groove 470 opening on the opposite side of the substrate layer 110. The second groove 470 is formed along each of the lines 5. That is, the second groove 470 is formed so as to correspond to the first groove 290. Here, formation of the second groove 470 corresponding to the first groove 290 means that the second groove 470 overlaps the first groove 290 when viewed in the facing direction. Therefore, the second groove 470 is continuous in the effective area 101 and the dummy area 102 and reaches the outer edge 110c of the substrate layer 110 when viewed in the facing direction.

[Method of Manufacturing Wafer]

Next, a method of manufacturing the wafer 100 will be described with reference to FIGS. 8 to 13. In FIGS. 8 to 13, (a) is cross-sectional view of a portion corresponding to the Fabry-Perot interference filter portion 1A, and (b) is a cross-sectional view of a portion corresponding to the dummy filter portion 2A.

Figure 8:
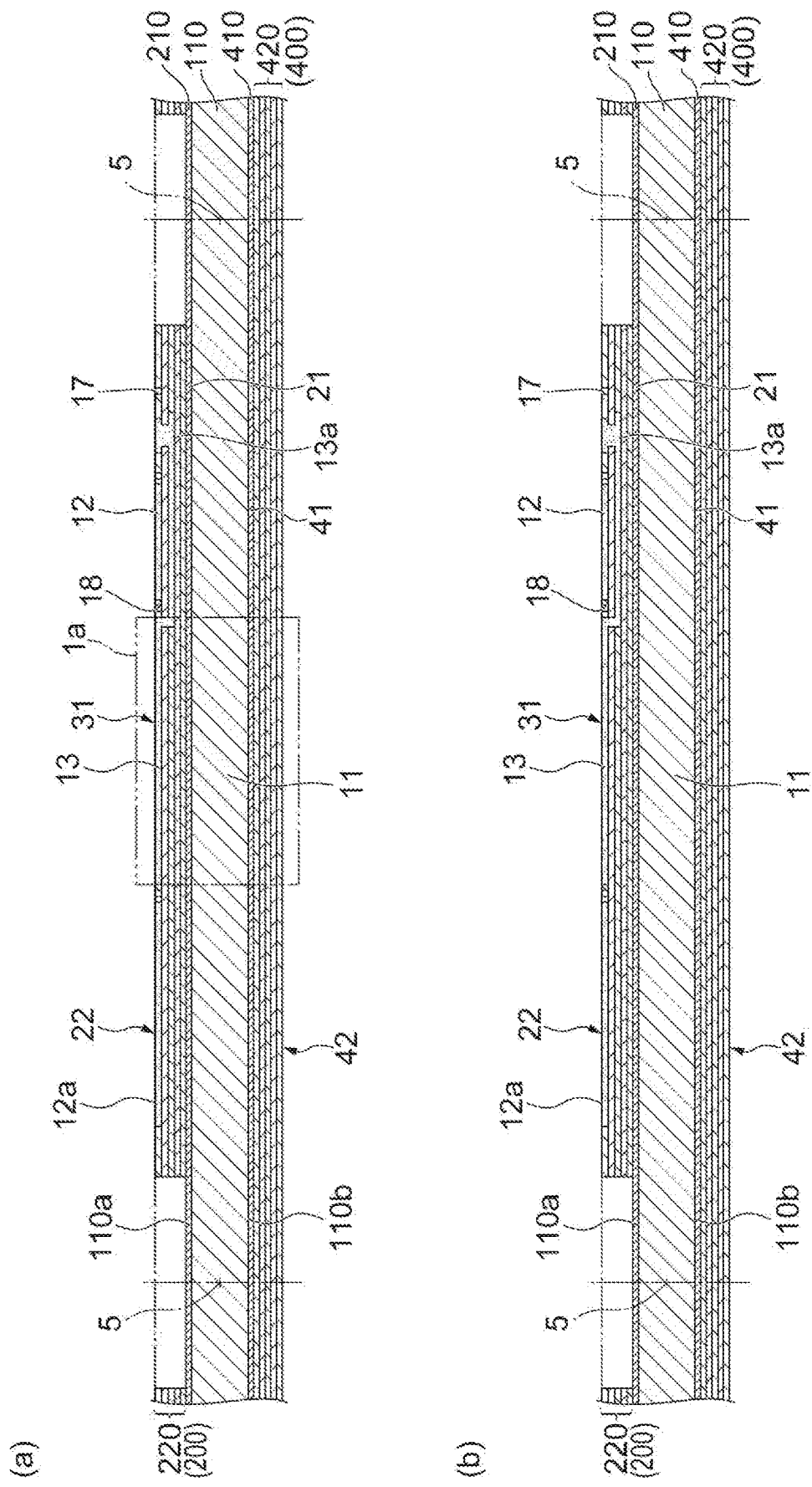
FIG. 8 is a cross-sectional view illustrating a method for manufacturing the wafer illustrated in FIG. 5.

First, as illustrated in FIG. 8, the reflection prevention layer 210 is formed on the first surface 110a of the substrate layer 110, while the reflection prevention layer 410 is formed on the second surface 110b of the substrate layer 110. Subsequently, a plurality of polysilicon layers and a plurality of silicon nitride layers are alternately laminated on each of the reflection prevention layers 210 and 410, so as to form the first mirror layer 220 on the reflection prevention layer 210 and form the layer 420 on the reflection prevention layer 410.

When the first mirror layer 220 is formed, etching is performed to remove a portion along each of the lines 5 in the first mirror layer 220 so as to expose the surface of the reflection prevention layer 210. In addition, by doping impurities to achieve low resistivity in a portion of a predetermined polysilicon layer in the first mirror layer 220, the first electrode 12, the second electrode 13, and the wiring 12a and 13a are formed in each of portions corresponding to the substrate 11. Moreover, etching is performed to form the trenches 17 and 18 on a surface of the first mirror layer 220 in each of portions corresponding to the substrate 11.

Figure 9:
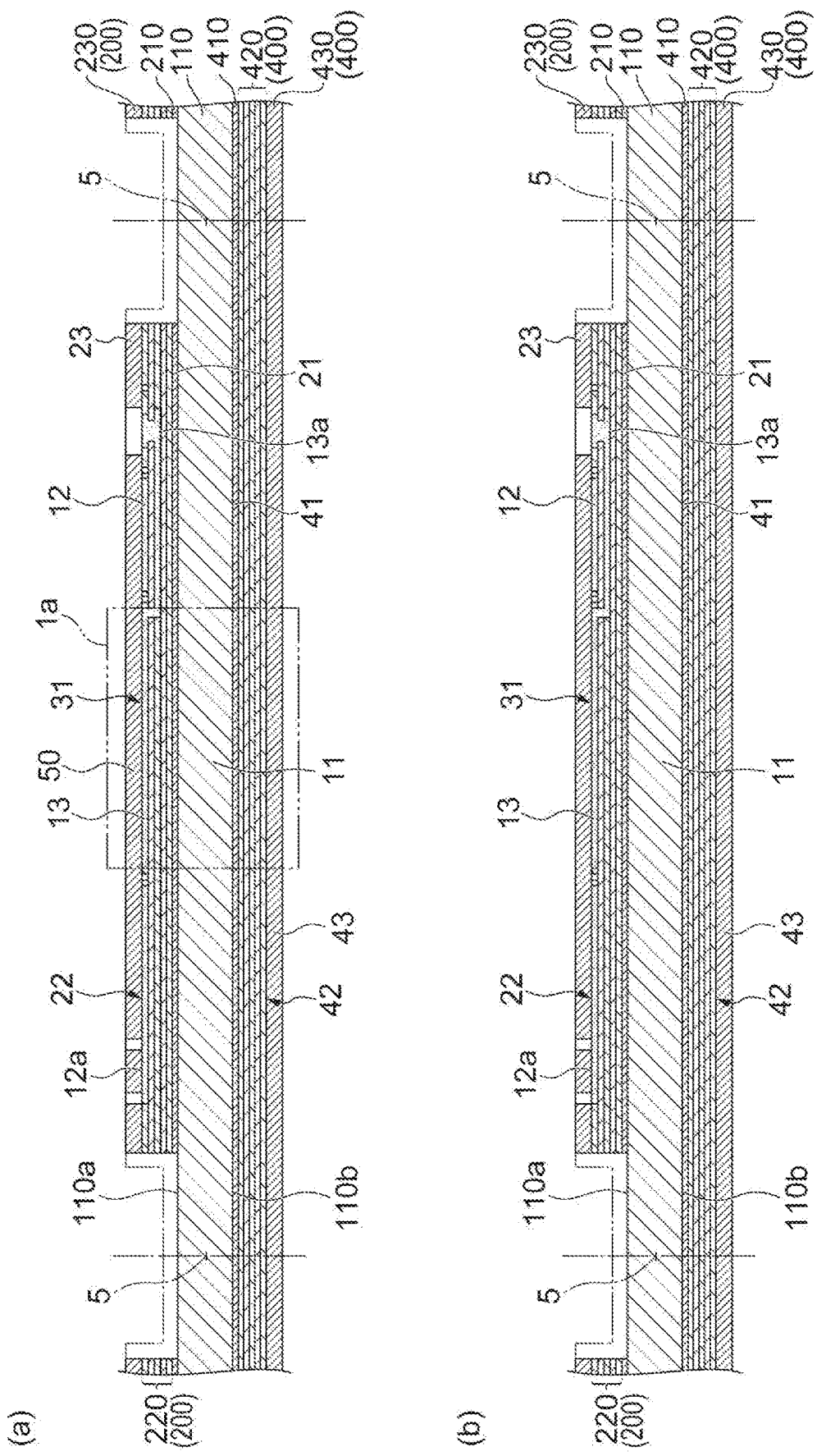
FIG. 9 is a cross-sectional view illustrating a method for manufacturing the wafer illustrated in FIG. 5.

Subsequently, as illustrated in FIG. 9, the intermediate layer 230 is formed on the first mirror layer 220 and on the exposed surface of the reflection prevention layer 210, and the layer 430 is formed on the layer 420. At a portion corresponding to each of the Fabry-Perot interference filter portions 1A, the intermediate layer 230 includes a portion 50 expected to be removed corresponding to the gap S (refer to FIG. 3). Subsequently, etching is performed to remove a portion along each of the lines 5 in the intermediate layer 230 and the reflection prevention layer 210 so as to expose the first surface 110a of the substrate layer 110. In addition, the etching is performed to form a gap at a portion corresponding to each of the terminals 15 and 16 (refer to FIG. 3) in the intermediate layer 230 for each of portions corresponding to the substrate 11.

Figure 10:
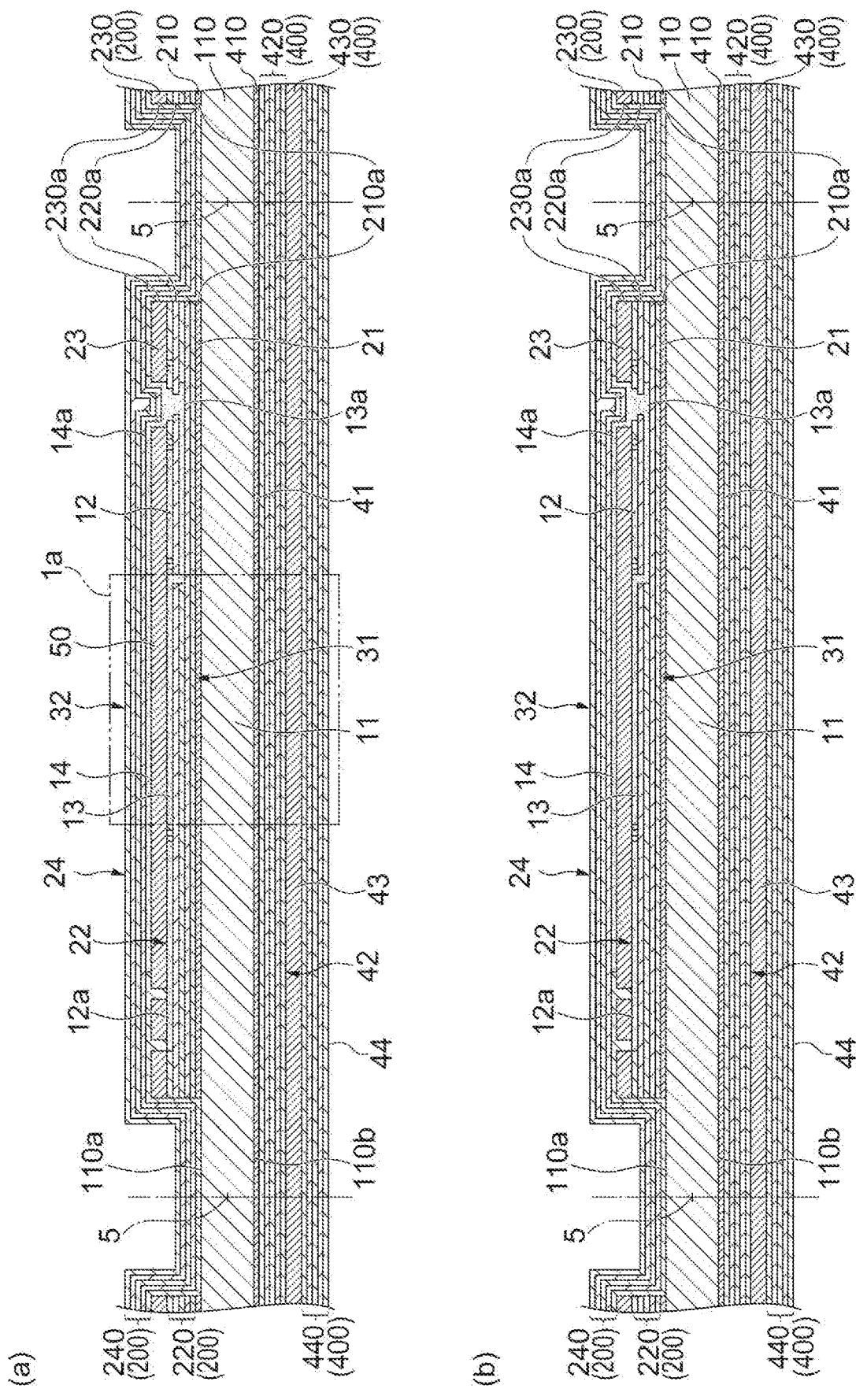
FIG. 10 is a cross-sectional view illustrating a method for manufacturing the wafer illustrated in FIG. 5.

Subsequently, as illustrated in FIG. 10, a plurality of polysilicon layers and a plurality of silicon nitride layers are alternately laminated on each of the first surface 110a side and the second surface 110b side of the substrate layer 110, thereby forming the second mirror layer 240 on the intermediate layer 230 and on the exposed first surface 110a of the substrate layer 110, as well as forming the layer 440 on the layer 430.

When the second mirror layer 240 is formed, side surfaces 230a of the intermediate layer 230, side surfaces 220a of the first mirror layer 220, and side surfaces 210a of the reflection prevention layer 210, facing each other along the line 5, are covered with the second mirror layer 240. In addition, by doping impurities to achieve low resistivity in a portion of a predetermined polysilicon layer in the second mirror layer 240, the third electrode 14 and the wiring 14a are formed in each of portions corresponding to the substrate 11.

Figure 11:
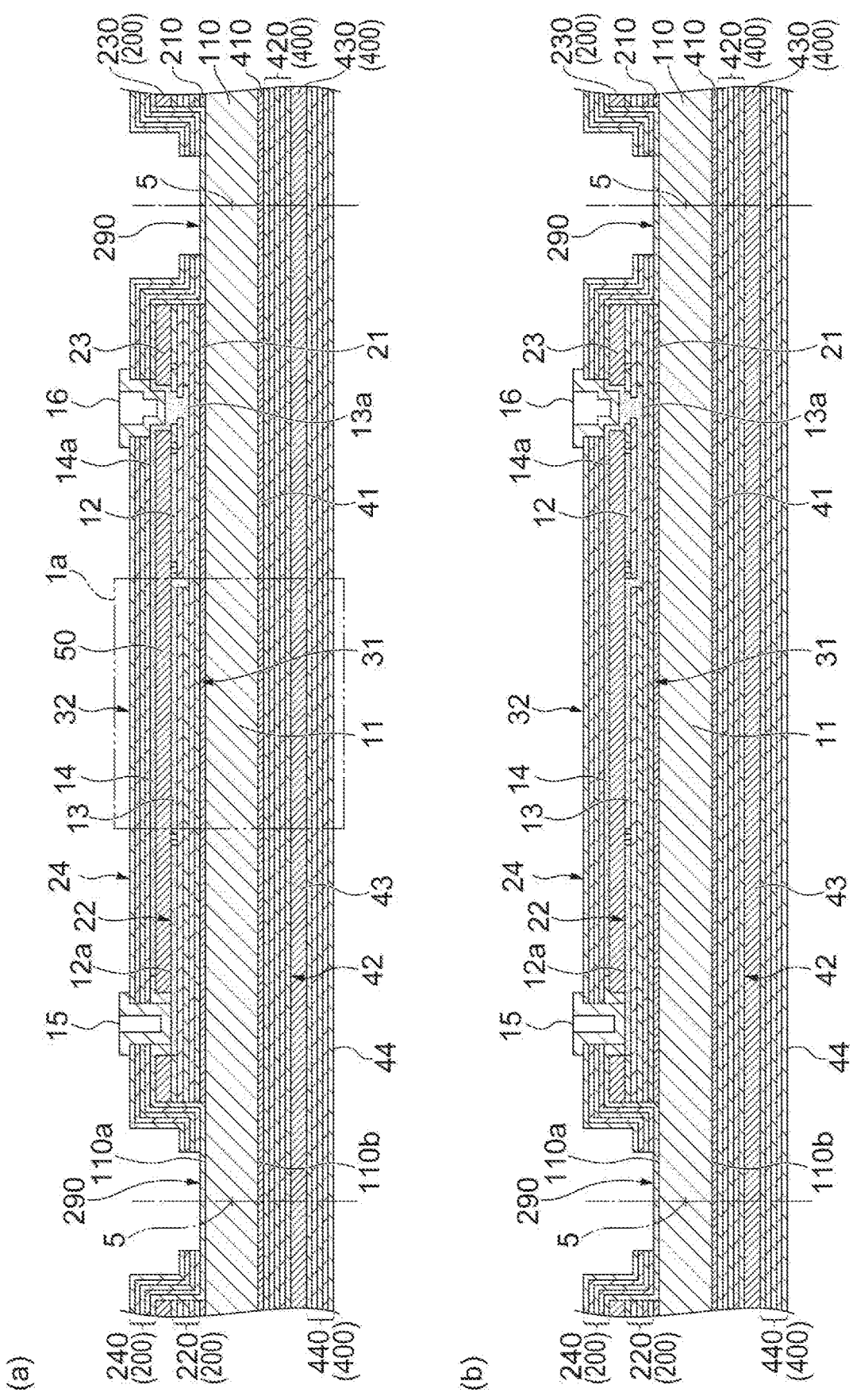
FIG. 11 is a cross-sectional view illustrating a method for manufacturing the wafer illustrated in FIG. 5.

Subsequently, as illustrated in (b) of FIG. 11, etching is performed to thin a portion along each of the lines 5 in the second mirror layer 240 so as to expose the surface of the polysilicon layer 27a (refer to FIG. 3) (that is, the polysilicon layer positioned closest to the first surface 110a side) included in the second mirror layer 240. In addition, the etching is performed to form a gap at a portion corresponding to each of the terminals 15 and 16 (refer to FIG. 3) in the second mirror layer 240 for each of portions corresponding to the substrate 11. Subsequently, the terminals 15 and 16 are formed in the gap for each of portions corresponding to the substrate 11, and the terminal 15 and the wiring 12a are connected to each other, while the terminal 16 and each of the wiring 13a and the wiring 14a are connected to each other.

With the procedure above, the reflection prevention layer 210 and the device layer 200 are formed on the first surface 110a of the substrate layer 110, while the first groove 290 is formed in the device layer 200. The first groove 290 is a region where the device layer 200 is partially thinned along each of the lines 5.

Figure 12:
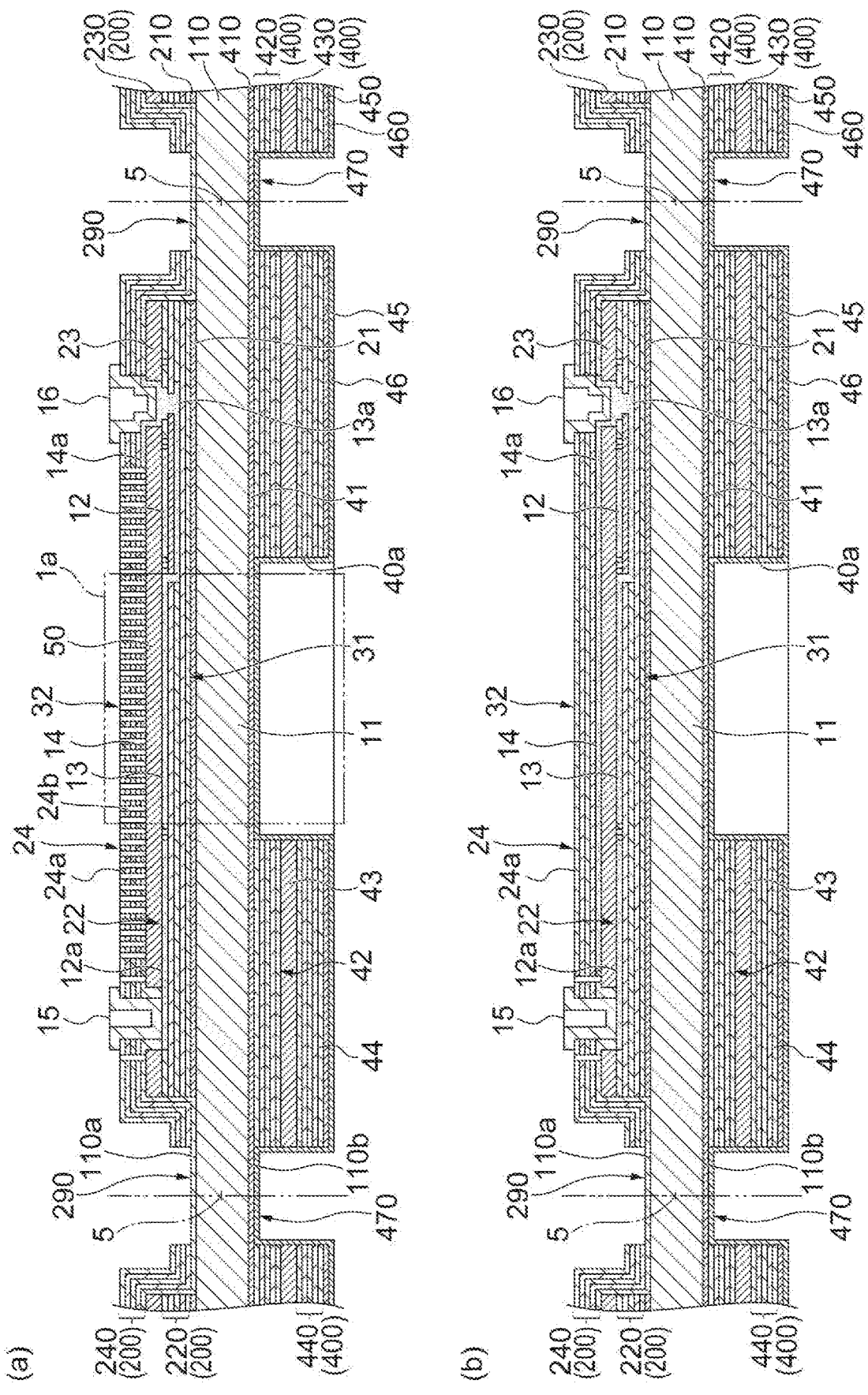
FIG. 12 is a cross-sectional view illustrating a method for manufacturing the wafer illustrated in FIG. 5.

Subsequently, as illustrated in (a) of FIG. 12, etching is performed in each of portions corresponding to the Fabry-Perot interference filter portion 1A so as to form, in the second laminate 24, the plurality of through-holes 24b from the surface 24a of the second laminate 24 to the portion 50 expected to be removed. At this time, as illustrated in (b) of FIG. 12, the plurality of through-holes 24b will not be formed in the second laminate 24 in a portion corresponding to each of the dummy filter portions 2A. Subsequently, as illustrated in FIG. 12, the light shielding layer 450 is formed on the layer 440. Subsequently, etching is performed to remove a portion along each of the lines 5 in the light shielding layer 450 and the stress adjustment layer 400 (that is, the layers 420, 430, and 440) so as to expose the surface of the reflection prevention layer 410. In addition, the etching is performed to form the opening 40a in each of portions corresponding to the substrate 11. Subsequently, the protective layer 460 is formed on the light shielding layer 450, the exposed surface of the reflection prevention layer 410, an inner surface of the opening 40a, and the side surface of the stress adjustment layer 400 facing the second groove 470.

With the procedure above, the reflection prevention layer 410, the stress adjustment layer 400, the light shielding layer 450, and the protective layer 460 are formed on the second surface 110b of the substrate layer 110, while the second groove 470 is formed in the stress adjustment layer 400. The second groove 470 is a region in which the stress adjustment layer 400 is partially thinned along each of the lines 5.

Figure 13:
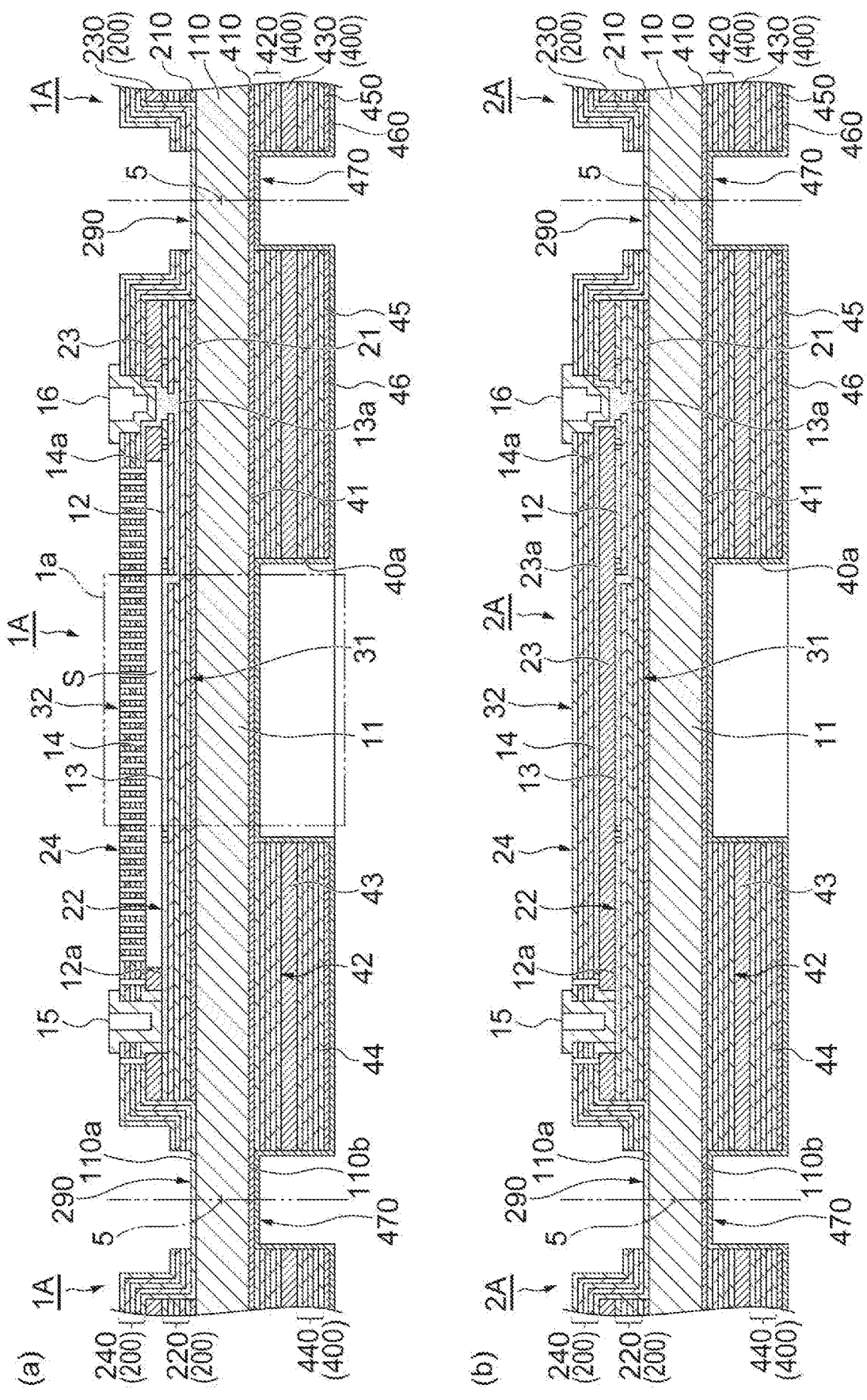
FIG. 13 is a cross-sectional view illustrating a method for manufacturing the wafer illustrated in FIG. 5.

Subsequently, as illustrated in (a) of FIG. 13, etching via a plurality of through-holes 24b (for example, gas phase etching using hydrofluoric acid gas) is performed at a portion corresponding to each of the Fabry-Perot interference filter portions 1A to collectively remove the plurality of portions 50 expected to be removed, from the intermediate layer 230. With this procedure, a gap S is formed in the portion corresponding to each of the Fabry-Perot interference filter portions 1A for each of portion corresponding to the substrate 11. At this time, as illustrated in (b) of FIG. 13, since the plurality of through-holes 24b is not formed in the second laminate 24 at the portion corresponding to each of the dummy filter portions 2A, the gap S will not be formed in the intermediate layer 230.

With the procedure described above, as illustrated in (a) of FIG. 7, the gap S is formed between the first mirror portion 31 and the second mirror portion 32 facing each other in the effective area 101, thereby forming the plurality of Fabry-Perot interference filter portions 1A. In contrast, in the dummy area 102, the intermediate layer 23 is provided between the first mirror portion 31 and the second mirror portion 32 facing each other as illustrated in (b) of FIG. 7, thereby forming the plurality of dummy filter portion 2A.

[Configuration of Optical Inspection Device of First Embodiment]

Figure 14:
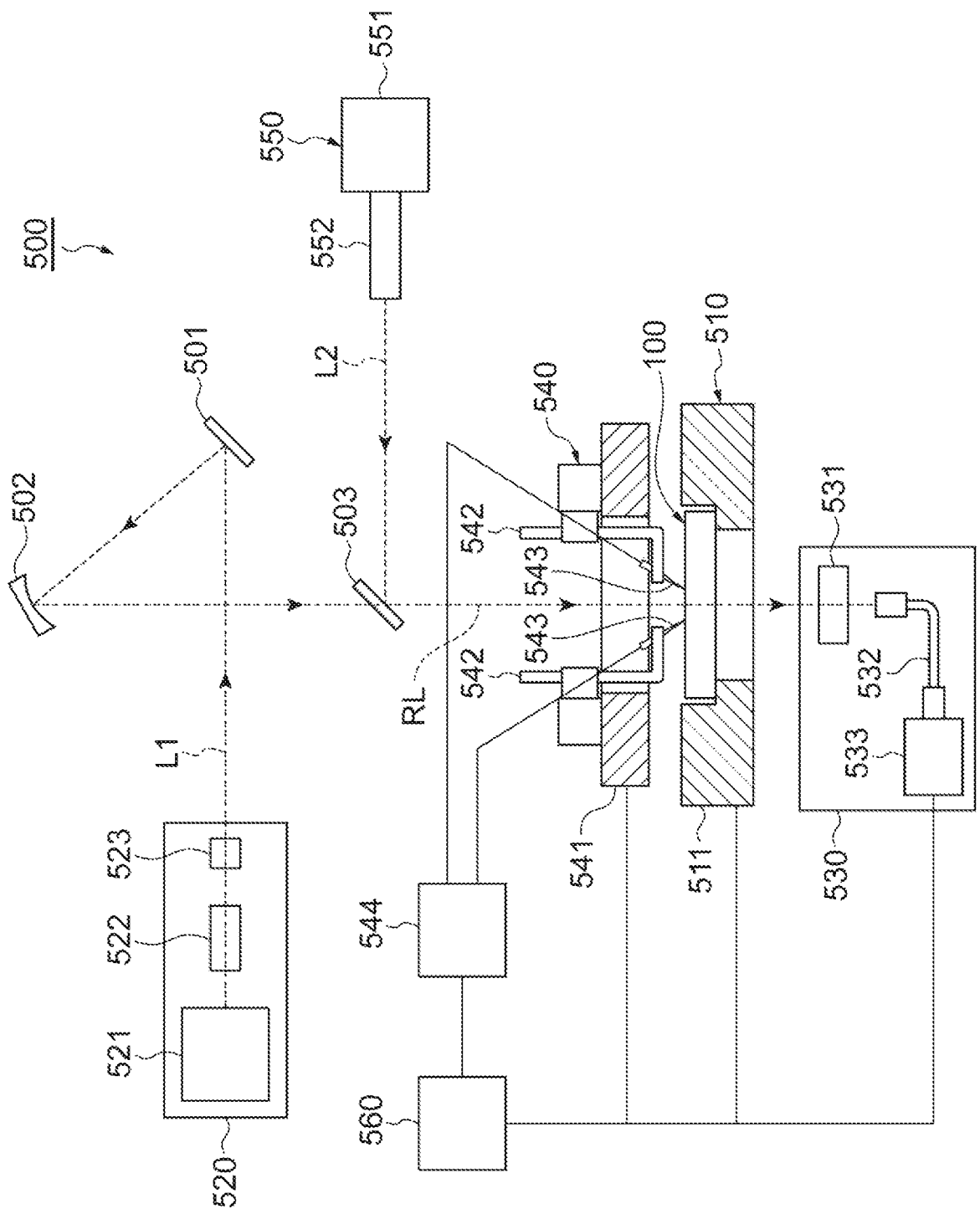
FIG. 14 is a configuration diagram of an optical inspection device according to a first embodiment.

Next, the configuration of the optical inspection device according to a first embodiment will be described. As illustrated in FIG. 14, an optical inspection device 500 according to the first embodiment includes a wafer support unit 510, a light emission unit 520, a light detection unit 530, a voltage application unit 540, an imaging unit 550, and a control unit 560. The wafer support unit 510, the light emission unit 520, the light detection unit 530, the voltage application unit 540, and the imaging unit 550 are disposed in a dark chamber (not illustrated). The inspection target of the optical inspection device 500 is the wafer 100.

The wafer support unit 510 supports wafer 100 such that the facing direction of wafer 100 (that is, the direction in which first mirror portion 31 and second mirror portion 32 face each other) is substantially parallel to a reference line RL. Note that it is sufficient as long as the wafer support unit 510 supports the wafer 100 such that the facing direction of wafer 100 follows along the reference line RL. That is, the wafer support unit 510 does not need to support the wafer 100 such that the facing direction of the wafer 100 is completely parallel to the reference line RL. The wafer support unit 510 includes a stage 511. The stage 511 is movable along a plane perpendicular to the reference line RL (at least along each of two directions parallel to the plane and orthogonal to each other). The stage 511 may be rotatable around a line parallel to the reference line RL as a center line.

Figure 15:
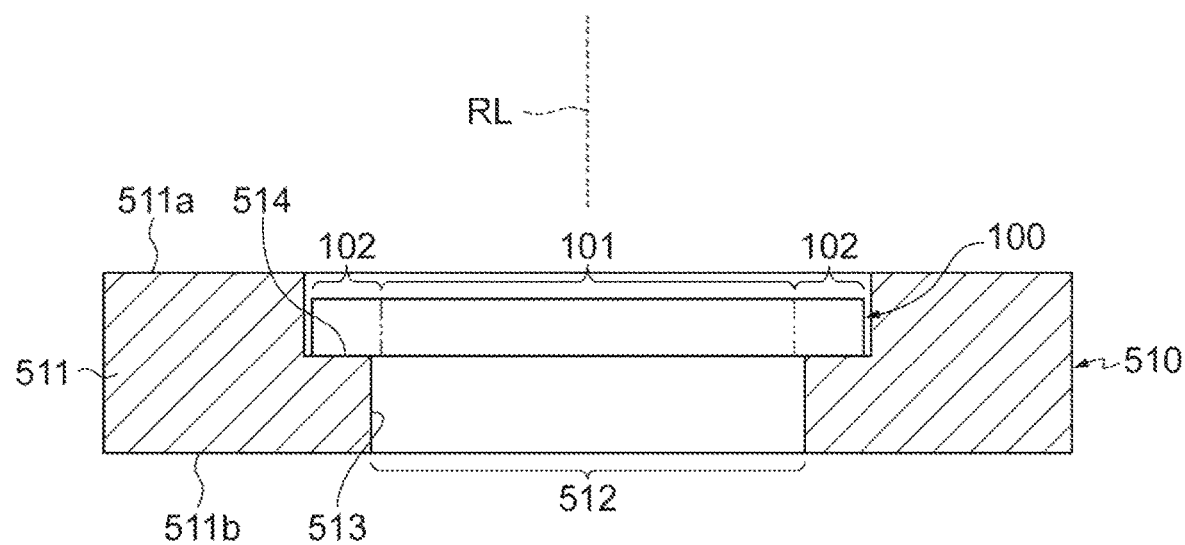
FIG. 15 is a cross-sectional view of a wafer support unit of the optical inspection device illustrated in FIG. 14.

As illustrated in FIG. 15, the stage 511 includes a first surface 511a and a second surface 511b opposite to the first surface 511a. As an example, the first surface 511a is an upper surface in the vertical direction, and the second surface 511b is a lower surface in the vertical direction. The stage 511 has an opening 513 opening to the first surface 511a and the second surface 511b. A step portion 514 is formed on the first surface 511a by widening a first surface 511a-side portion of the opening 513. The dummy area 102 of the wafer 100 is positioned on the step portion 514, and is held by suction, for example. The opening 513 faces the effective area 101 with the dummy area 102 of the wafer 100 positioned on the step portion 514. Specifically, when viewed in a direction parallel to the reference line RL, the opening 513 includes the effective area 101. The opening 513 functions as a light passage region 512 that allows light L1 to pass along the reference line RL. That is, the wafer support unit 510 has the opening 513 defined as the light passage region 512.

As illustrated in FIG. 14, the light emission unit 520 emits the light L1 incident along the reference line RL, onto each of Fabry-Perot interference filter portions 1A of the wafer 100 supported by the wafer support unit 510. The light emission unit 520 includes a white light source 521, a lens 522, and an aperture member 523. The white light source 521 outputs the light L1 being white light. The lens 522 condenses the light L1 output from the white light source 521 on a pinhole of the aperture member 523. The aperture member 523 uses the pinhole to narrow the light L1 condensed by the lens 522. In this manner, the light emission unit 520 is configured to simultaneously emit light L1 with a plurality of wavelengths. The light L1 emitted from the light emission unit 520 is reflected by a mirror 501. The light L reflected by the mirror 501 is further reflected on a concave mirror 502 so as to travel on the reference line RL and condensed (or collimated). The light L1 reflected and condensed by the concave mirror 502 is transmitted through a half mirror 503. The light L1 transmitted through the half mirror 503 is incident along the reference line RL on each of Fabry-Perot interference filter portions 1A of the wafer 100 supported by the wafer support unit 510.

The light detection unit 530 detects the light L1 transmitted along the reference line RL through each of Fabry-Perot interference filter portions 1A of the wafer 100 supported by the wafer support unit 510. The light detection unit 530 has a lens 531, an optical fiber 532, and a spectroscope 533. The lens 531 condenses the light L1 transmitted along the reference line RL through each of Fabry-Perot interference filter portions 1A onto a light incident end of the optical fiber 532. The light L1 transmitted through the lens 531 may be condensed onto the light incident end of the optical fiber 532 via a reflection mirror (not illustrated). The optical fiber 532 guides the light L1 condensed by the lens 531. The spectroscope 533 detects the light L1 guided by the optical fiber 532 for each of wavelengths, and outputs a detection signal to the control unit 560. In this manner, the light detection unit 530 is configured to detect the light L1 with the plurality of wavelengths, for each of the wavelengths.

The voltage application unit 540 applies a voltage to each of the Fabry-Perot interference filter portions 1A so as to change the distance between the first mirror portion 31 and the second mirror portion 32 facing each other. The voltage application unit 540 includes a stage 541, a pair of arms 542, a pair of probe needles 543, and a source measure unit 544. The stage 541 is movable in a direction parallel to the reference line RL. The pair of arms 542 are attached to the stage 541. The pair of probe needles 543 are attached to the pair of arms 542. The pair of arms 542 and the pair of probe needles 543 are provided as a micromanipulator. The distance between the distal ends of the pair of probe needles 543 is adjusted to the distance between the pair of terminals 15 and 16 in each of the Fabry-Perot interference filter portions 1A. The source measure unit 544 provides a potential difference between the pair of probe needles 543. Note that the stage 541 need not be configured to be movable in a case where the stage 511 is configured to be movable in a direction parallel to the reference line RL in the wafer support unit 510. Furthermore, a probe card, instead of the micromanipulator, may be applied to the voltage application unit 540.

The imaging unit 550 images the wafer 100 (specifically, the surface of the wafer 100) supported by the wafer support unit 510. The imaging unit 550 includes a camera 551 and a zoom lens 552. The camera 551 emits light L2 for observation, detects the light L2 reflected on the surface of the wafer 100 supported by the wafer support unit 510, and displays an obtained image on a display (not illustrated). The zoom lens 552 has a function of enlarging an image on the surface of the wafer 100. The light L2 emitted from the camera 551 is reflected by the half mirror 503 so as to travel on the reference line RL. The light L2 reflected by the half mirror 503 travels on the reference line RL, and is reflected on the surface of the wafer 100 supported by the wafer support unit 510. The light L2 reflected on the surface of the wafer 100 travels on the same optical path in the opposite direction so as to be incident on the camera 551 via the zoom lens 552.

The control unit 560 is configured as a computer device including a processor, memory, storage, a communication device, or the like. In the control unit 560, the processor executes a predetermined piece of software (programs) read into the memory or the like and controls data reading and writing or the like in the memory or storage, thereby implementing various functions. For example, the control unit 560 controls the operation of individuals units (the wafer support unit 510, the light emission unit 520, the light detection unit 530, the voltage application unit 540, and the imaging unit 550) to implement an optical inspection method described below.

In the optical inspection device 500 configured as described above, the operation of each of units is controlled by the control unit 560, so that the optical inspection method is performed as follows. First, a wafer 100 as an inspection target is prepared and supported by the wafer support unit 510. At this time, the wafer 100 is supported by the wafer support unit 510 such that the facing direction follows along the reference line RL. Subsequently, the wafer 100 supported by the wafer support unit 510 is imaged by the imaging unit 550, allowing an image of the wafer 100 to be displayed on the display. Thereafter, for example, an image of the wafer 100 displayed on the display is visually observed, and deviation of the wafer 100 (for example, the center position of the wafer 100) from a predetermined initial position (predetermined coordinates) will be corrected. With this operation, the control unit 560 can acquire coordinate information of each of the Fabry-Perot interference filter portions 1A on the wafer 100 supported by the wafer support unit 510, as a relative position with respect to the predetermined initial position. Note that the imaging unit 550 may be connected to the control unit 560, and the control unit 560 may acquire the coordinate information of each of the Fabry-Perot interference filter portions 1A on the wafer 100 on the basis of imaging data output from the imaging unit 550.

Subsequently, the stage 511 of the wafer support unit 510 is controlled to operate on the basis of the coordinate information, and one Fabry-Perot interference filter portion 1A is controlled to be located on the reference line RL (hereinafter, the one Fabry-Perot interference filter portion 1A located on the reference line RL will simply be referred to as the "one Fabry-Perot interference filter portion 1A"). Subsequently, the stage 541 of the voltage application unit 540 is controlled to operate, and the pair of probe needles 543 of the voltage application unit 540 is brought into contact with the pair of terminals 15 and 16 of the one Fabry-Perot interference filter portion 1A. Subsequently, the source measure unit 544 of the voltage application unit 540 is controlled to operate, and a predetermined voltage is applied to the pair of terminals 15 and 16. With this operation, in one Fabry-Perot interference filter portion 1A, the distance between the first mirror portion 31 and the second mirror portion 32 facing each other changes to a distance corresponding to the applied voltage.

Subsequently, light L1 is emitted from the light emission unit 520. With this operation, the light L1 is incident on one Fabry-Perot interference filter portion 1A along the reference line RL (that is, in the facing direction). When light L1 is incident on the one Fabry-Perot interference filter portion 1A, the light L1 having a wavelength corresponding to the distance between the first mirror portion 31 and the second mirror portion 32 facing each other is transmitted through the one Fabry-Perot interference filter portion 1A. Thereafter, the light L1 transmitted through the one Fabry-Perot interference filter portion 1A is detected by the light detection unit 530. With this configuration, the control unit 560 can obtain a relationship between the applied voltage and the wavelength of the transmitted light for one Fabry-Perot interference filter portion 1A on the basis of the detection signal output from the light detection unit 530 or can determine whether the one Fabry-Perot interference filter portion 1A is a non-faulty product. Note that it is allowable to perform, at the time of this inspection, a measurement of leakage current between the pair of terminals 15 and 16 together with the application of a voltage to the Fabry-Perot interference filter portion 1A by the source measure unit 544, and may thereby measure the presence or absence of a foreign substance in the gap S formed between the first mirror portion 31 and the second mirror portion 32 facing each other, the presence or absence of disconnection in the wiring provided in each of the Fabry-Perot interference filter portions 1A, or the like.

When the inspection of one Fabry-Perot interference filter portion 1A is completed, the stage 541 of the voltage application unit 540 is controlled to operate, and the pair of probe needles 543 of the voltage application unit 540 is separated from the pair of terminals 15 and 16 of the one Fabry-Perot interference filter portion 1A. Subsequently, next one Fabry-Perot interference filter portion 1A is positioned on the reference line RL, and the inspection of the next one Fabry-Perot interference filter portion 1A is similarly performed. Hereinafter, the inspection of each of the Fabry-Perot interference filter portions 1A is sequentially performed in a similar manner. With this configuration, the control unit 560 can store information (inspection result) related to each of the Fabry-Perot interference filter portions 1A in association with the coordinate information of each of the Fabry-Perot interference filter portions 1A on the wafer 100. Note that the emission of the light L1 from the light emission unit 520 is not limited to the case where ON/OFF is switched for each of the Fabry-Perot interference filter portions 1A, and emission ON may be maintained during the inspection of the plurality of Fabry-Perot interference filter portions 1A. In addition, for a Fabry-Perot interference filter portion 1A that has been determined to be outside non-faulty products by a prior inspection (visual inspection, electrical inspection, or the like), it is allowable to suppress the contact of the pair of probe needles 543 with a pair of terminals 15 and 16 (the light transmission inspection may be omitted), and the light transmission inspection may be performed on next one Fabry-Perot interference filter portion 1A to improve the inspection efficiency. Furthermore, a light transmission inspection may be implemented on a predetermined percentage of the Fabry-Perot interference filter portions 1A among all the Fabry-Perot interference filter portions 1A on one wafer 100 so as to determine whether the one wafer 100 is a non-faulty product. That is, the light transmission inspection for the Fabry-Perot interference filter portion 1A does not necessarily need to be performed for all the Fabry-Perot interference filter portions 1A in one wafer 100.

As described above, in the optical inspection device 500 according to the first embodiment, the light emission unit 520 is configured to simultaneously emit light L1 with a plurality of wavelengths, and the light detection unit 530 is configured to detect the light L1 with the plurality of wavelengths, for each of the wavelengths. Accordingly, by changing the level of the voltage applied to the Fabry-Perot interference filter portion 1A and thereby acquiring the wavelength at which the detection intensity of the light L1 reaches a peak at each of the voltages, it is possible to acquire the relationship between the level of the voltage applied and the wavelength of the transmitted light for each of the Fabry-Perot interference filter portions 1A.

[Configuration of Optical Inspection Device of Second Embodiment]

Figure 16:
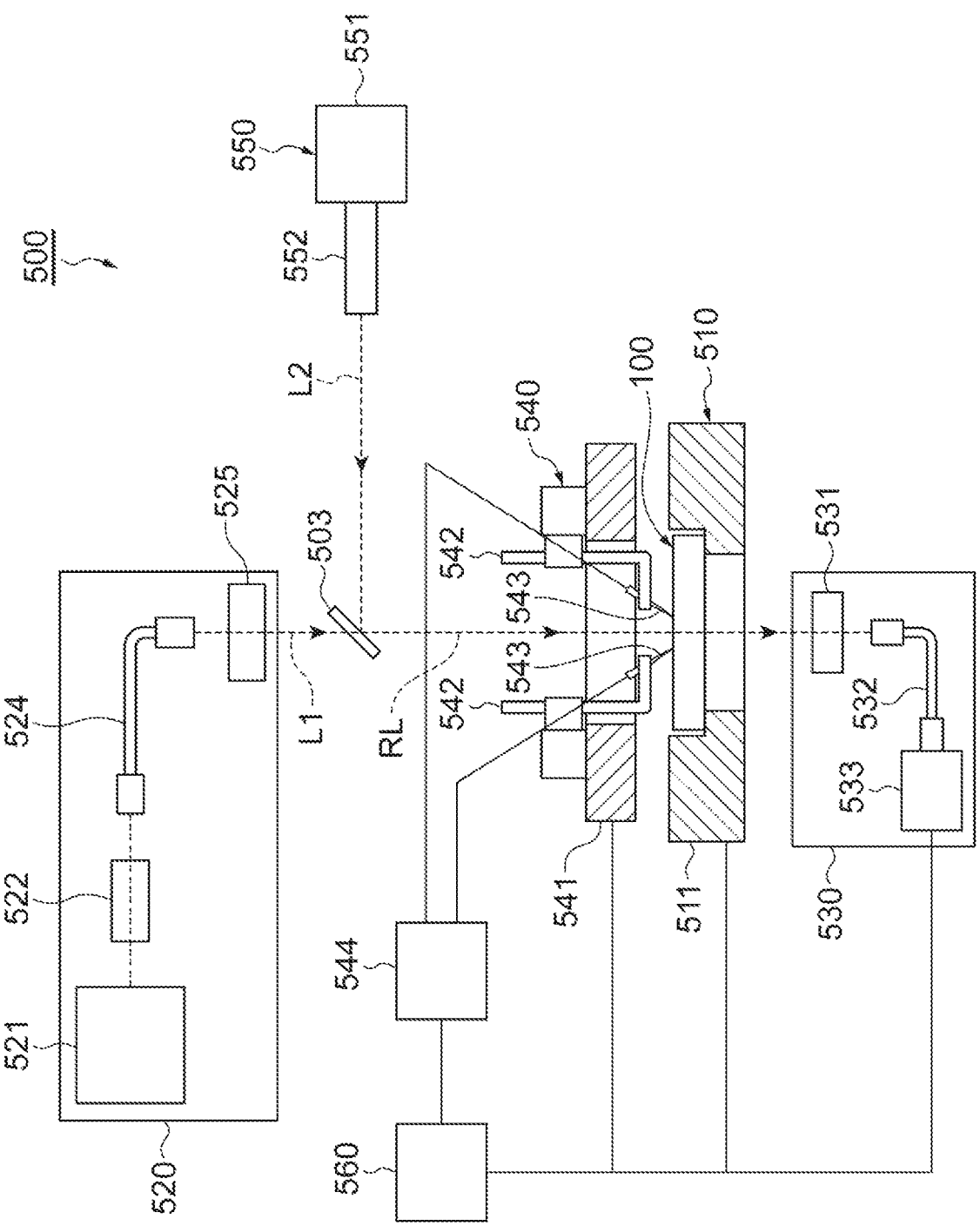
FIG. 16 is a configuration diagram of an optical inspection device according to a second embodiment.

Next, the configuration of the optical inspection device according to a second embodiment will be described. As illustrated in FIG. 16, the optical inspection device 500 according to the second embodiment is different from the optical inspection device 500 of the first embodiment in the configuration of the light emission unit 520.

In the optical inspection device 500 of the second embodiment, the light emission unit 520 includes the white light source 521, the lens 522, an optical fiber 524, and a lens 525. The white light source 521 outputs the light L1 being white light. The lens 522 condenses the light L1 output from the white light source 521 onto a light incident end of the optical fiber 524. The optical fiber 524 guides the light L1 condensed by the lens 522. The lens 525 condenses the light L1 guided by the optical fiber 524 onto the reference line RL.

The optical inspection device 500 of the second embodiment does not include the mirror 501 or the concave mirror 502, and the light L1 condensed by the lens 525 is transmitted through the half mirror 503. The light L1 transmitted through the half mirror 503 is incident along the reference line RL on each of Fabry-Perot interference filter portions 1A of the wafer 100 supported by the wafer support unit 510.

Similarly to the optical inspection device 500 according to the first embodiment, in the optical inspection device 500 according to the second embodiment, the light emission unit 520 is configured to simultaneously emit light L1 with a plurality of wavelengths, and the light detection unit 530 is configured to detect the light L1 with the plurality of wavelengths, for each of the wavelengths. Accordingly, by changing the level of the voltage applied to the Fabry-Perot interference filter portion 1A and thereby acquiring the wavelength at which the detection intensity of the light L1 reaches a peak at each of the voltages, it is possible to acquire the relationship between the level of the voltage applied and the wavelength of the transmitted light for each of the Fabry-Perot interference filter portions 1A.

[Configuration of Optical Inspection Device of Third Embodiment]

Figure 17:
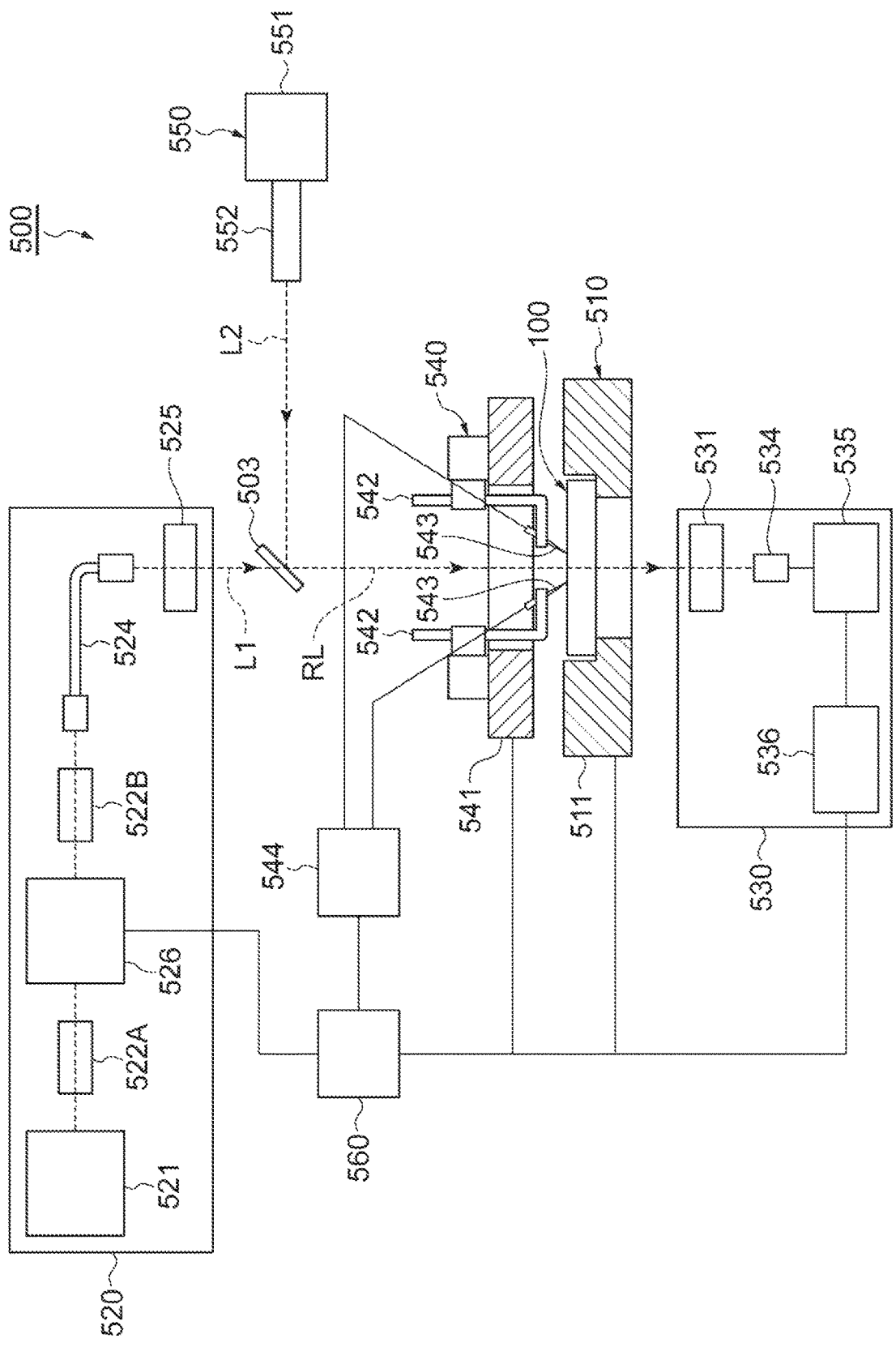
FIG. 17 is a configuration diagram of an optical inspection device according to a third embodiment.

Next, the configuration of the optical inspection device according to a third embodiment will be described. As illustrated in FIG. 17, the optical inspection device 500 according to the third embodiment is different from the optical inspection device 500 of the first embodiment in the configuration of the light emission unit 520 and the light detection unit 530.

In the optical inspection device 500 of the third embodiment, the light emission unit 520 includes the white light source 521, a lens 522A, a monochromator 526, a lens 522B, the optical fiber 524, and the lens 525. The white light source 521 outputs the light L1 being white light. The lens 522A condenses the light L1 output from the white light source 521 onto the monochromator 526. The monochromator 526 outputs light L1 having a predetermined wavelength among the white light condensed by the lens 522A. The lens 522B condenses the light L1 output from the monochromator 526 onto a light incident end of the optical fiber 524. The optical fiber 524 guides the light L1 condensed by the lens 522B. The lens 525 condenses the light L1 guided by the optical fiber 524 onto the reference line RL. Note that, it is allowable to use the aperture member 523, the mirror 501, and the concave mirror 502 as in the first embodiment, instead of using the optical fiber 524 and the lens 525. In this manner, in individual embodiments, the means for aligning the light L1 emitted from the light source with the reference line RL can be replaced with various means employed in individual embodiments.

The optical inspection device 500 of the third embodiment does not include the mirror 501 or the concave mirror 502, and the light L1 condensed by the lens 525 is transmitted through the half mirror 503. The light L1 transmitted through the half mirror 503 is incident along the reference line RL on each of Fabry-Perot interference filter portions 1A of the wafer 100 supported by the wafer support unit 510.

In the optical inspection device 500 according to the third embodiment, the light L1 incident on each of the Fabry-Perot interference filter portions 1A is light having a predetermined wavelength in the white light output from the white light source 521. The monochromator 526 can switch the wavelength of the light L1 to be output. This enables the configuration of the light emission unit 520 to sequentially emit light L1 with a plurality of wavelengths switched for each of the wavelengths.

In the optical inspection device 500 according to the third embodiment, the light detection unit 530 includes a lens 531, a photodiode 534, an amplifier 535, and an AD converter 536. The lens 531 condenses the light L1 transmitted through each of the Fabry-Perot interference filter portions 1A along the reference line RL onto the photodiode 534. The photodiode 534 has sensitivity to white light. The photodiode 534 detects the light L1 condensed by the lens 531 and outputs an analog signal to the amplifier 535. The amplifier 535 amplifies the analog signal output from the photodiode 534. The AD converter 536 converts the analog signal amplified by the amplifier 535 to a digital signal, and outputs the digital signal to the control unit 560. In this manner, the light detection unit 530 is configured to have sensitivity to the light L1 with the plurality of wavelengths emitted from the light emission unit 520.

In the optical inspection device 500 according to the third embodiment, unlike the optical inspection device 500 according to the first embodiment, the light emission unit 520 is configured to emit light L1 with a plurality of wavelengths for each of the wavelengths, and the light detection unit 530 is configured to have sensitivity to the light L1 with the plurality of wavelengths. Therefore, by changing the wavelength of the light L1 to be emitted to change the level of the voltage applied to the Fabry-Perot interference filter portion 1A at each of the wavelengths and thereby acquiring a voltage at which the detection intensity of the light L1 reaches a peak, it is possible to acquire the relationship between the level of the applied voltage and the wavelength of the transmitted light for each of the Fabry-Perot interference filter portions 1A. Alternatively, by changing the level of the voltage applied to the Fabry-Perot interference filter portion 1A to change the wavelength of light L1 to be emitted at each of the voltages and thereby acquiring the wavelength at which the detection intensity of light L1 reaches a peak at each of the voltages, it is possible to acquire the relationship between the level of the voltage applied and the wavelength of the transmitted light for each of the Fabry-Perot interference filter portions 1A.

[Configuration of Optical Inspection Device of Fourth Embodiment]

Figure 18:
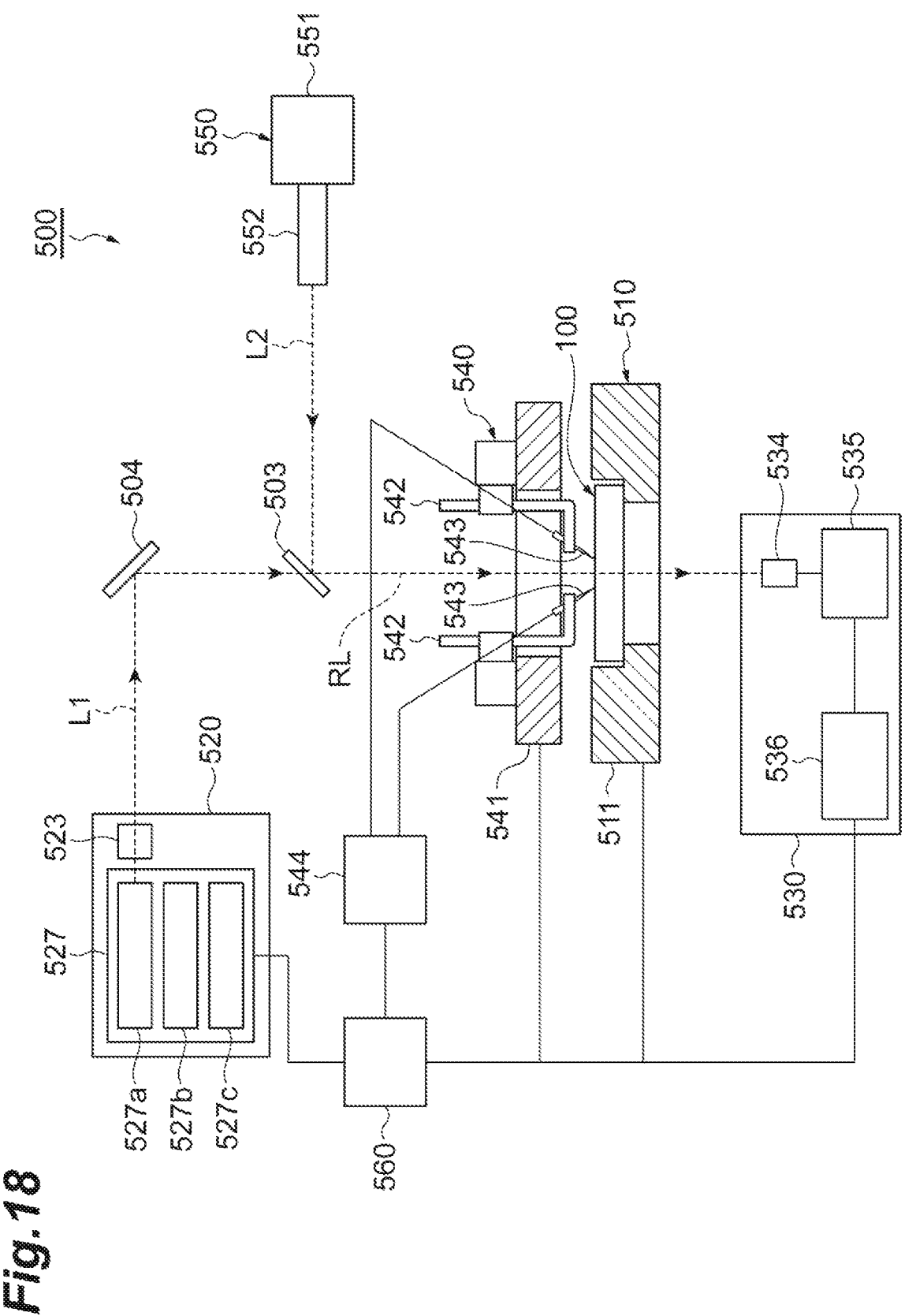
FIG. 18 is a configuration diagram of an optical inspection device according to a fourth embodiment.

Next, the configuration of the optical inspection device according to a fourth embodiment will be described. As illustrated in FIG. 18, the optical inspection device 500 according to the fourth embodiment is different from the optical inspection device 500 of the third embodiment in the configuration of the light emission unit 520 and the light detection unit 530.

In the optical inspection device 500 according to the fourth embodiment, the light emission unit 520 includes a light source switching unit 527 and the aperture member 523. The light source switching unit 527 switches between a plurality of laser light sources 527a, 527b, and 527c. Each of the laser light sources 527a, 527b, and 527c emits laser light each having a mutually different wavelength. The number of laser light sources can be appropriately changed according to the required wavelength. The aperture member 523 uses a pinhole to narrow the light L1, which is laser light emitted from the light source switching unit 527. In this manner, the light emission unit 520 is configured to emit light L1 with a plurality of wavelengths, for each of wavelengths. The light L1 emitted from the light emission unit 520 is reflected by the mirror 504 so as to travel on the reference line RL. The light L1 reflected by the mirror 504 is transmitted through the half mirror 503. The light L1 transmitted through the half mirror 503 is incident along the reference line RL on each of Fabry-Perot interference filter portions 1A of the wafer 100 supported by the wafer support unit 510. In a case where the intensity of the light L1 emitted from the laser light sources 527a, 527b, or 527c exceeds a measurable intensity range of the photodiode 534, an ND filter may be provided at a certain position on the optical path between each of the laser light sources 527a, 527b, or 527c and the photodiode 534, for example, so as to attenuate the light L1.

In the optical inspection device 500 according to the fourth embodiment, the light detection unit 530 includes the photodiode 534, the amplifier 535, and the AD converter 536. The photodiode 534 has sensitivity to the laser light with the plurality of wavelengths emitted from the light emission unit 520. The photodiode 534 detects the light L1 transmitted through each of the Fabry-Perot interference filter portions 1A along the reference line RL, and outputs an analog signal to the amplifier 535. The amplifier 535 amplifies the analog signal output from the photodiode 534. The AD converter 536 converts the analog signal amplified by the amplifier 535 to a digital signal, and outputs the digital signal to the control unit 560. In this manner, the light detection unit 530 is configured to have sensitivity to the light L1 with the plurality of wavelengths emitted from the light emission unit 520.

In the optical inspection device 500 according to the fourth embodiment, similarly to the optical inspection device 500 of the third embodiment, the light emission unit 520 is configured to emit light L1 with a plurality of wavelengths for each of wavelengths, and the light detection unit 530 is configured to have sensitivity to the light L1 with the plurality of wavelengths. Therefore, by changing the wavelength of the light L1 to be emitted to change the level of the voltage applied to the Fabry-Perot interference filter portion 1A at each of the wavelengths and thereby acquiring a voltage at which the detection intensity of the light L1 reaches a peak, it is possible to acquire the relationship between the level of the applied voltage and the wavelength of the transmitted light for each of the Fabry-Perot interference filter portions 1A. Alternatively, by changing the level of the voltage applied to the Fabry-Perot interference filter portion 1A to change the wavelength of light L1 to be emitted at each of the voltages and thereby acquiring the wavelength at which the detection intensity of light L1 reaches a peak at each of the voltages, it is possible to acquire the relationship between the level of the voltage applied and the wavelength of the transmitted light for each of the Fabry-Perot interference filter portions 1A.

[Configuration of Optical Inspection Device of Fifth Embodiment]

Figure 19:
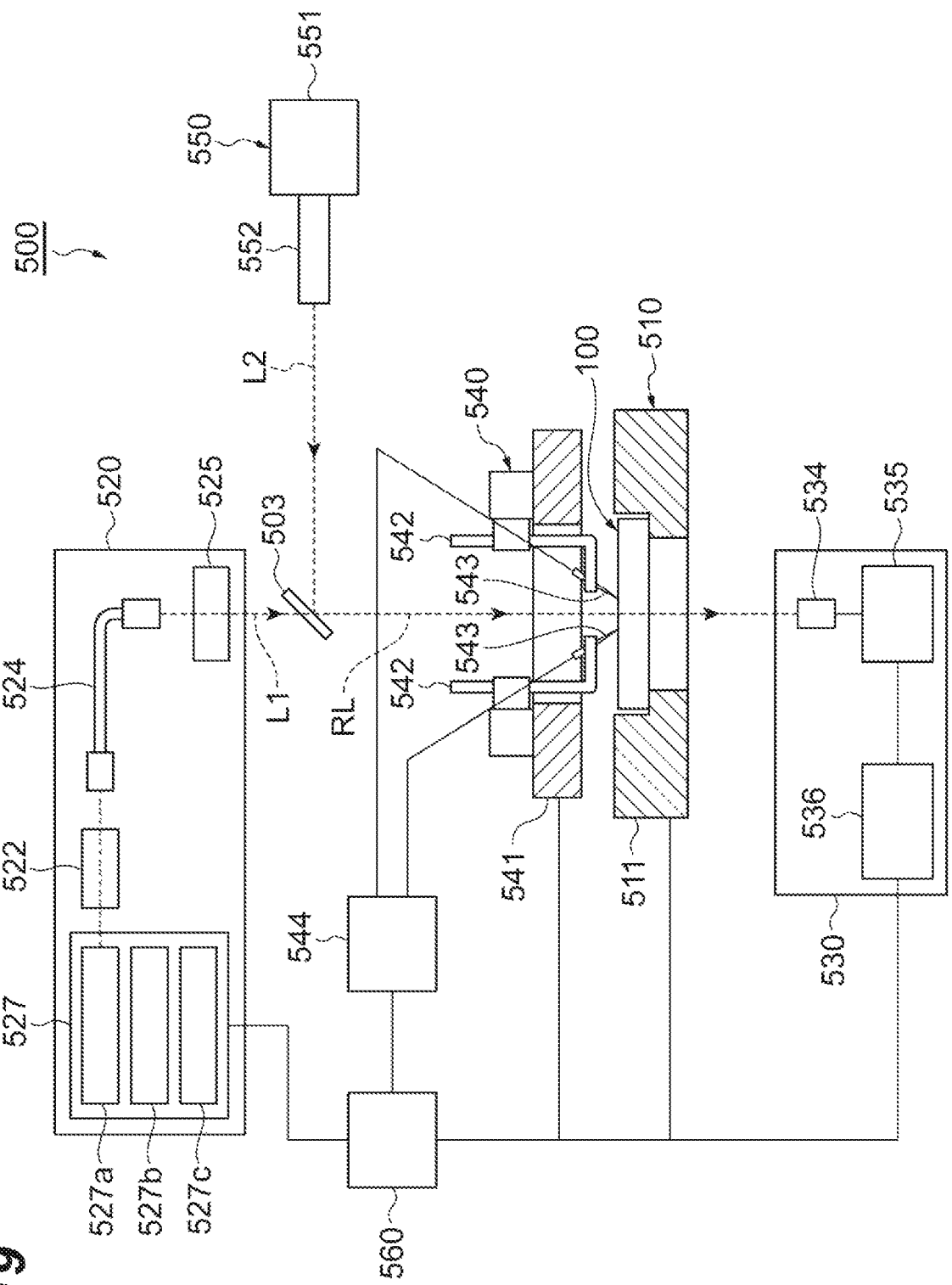
FIG. 19 is a configuration diagram of an optical inspection device according to a fifth embodiment.

Next, the configuration of the optical inspection device according to a fifth embodiment will be described. As illustrated in FIG. 19, the optical inspection device 500 according to the fifth embodiment is different from the optical inspection device 500 of the fourth embodiment in the configuration of the light emission unit 520.

In the optical inspection device 500 according to the fifth embodiment, the light emission unit 520 includes the light source switching unit 527, the lens 522, the optical fiber 524, and the lens 525. The light source switching unit 527 switches between a plurality of laser light sources 527a, 527b, and 527c. Each of the laser light sources 527a, 527b, and 527c emits laser light each having a mutually different wavelength. The number of laser light sources can be appropriately changed according to the required wavelength. The lens 522 condenses the light L1 output from the light source switching unit 527 onto a light incident end of the optical fiber 524. The optical fiber 524 guides the light L1 condensed by the lens 522. The lens 525 condenses the light L1 guided by the optical fiber 524 onto the reference line RL. In this manner, the light emission unit 520 is configured to emit light L1 with a plurality of wavelengths, for each of wavelengths. The optical inspection device 500 of the fifth embodiment does not include the mirror 504, and the light L1 emitted from the light emission unit 520 is transmitted through the half mirror 503. The light L1 transmitted through the half mirror 503 is incident along the reference line RL on each of Fabry-Perot interference filter portions 1A of the wafer 100 supported by the wafer support unit 510.

In the optical inspection device 500 according to the fifth embodiment, similarly to the optical inspection device 500 of the fourth embodiment, the light emission unit 520 is configured to emit light L1 with a plurality of wavelengths for each of wavelengths, and the light detection unit 530 is configured to have sensitivity to the light L1 with the plurality of wavelengths. Therefore, by changing the wavelength of the light L1 to be emitted to change the level of the voltage applied to the Fabry-Perot interference filter portion 1A at each of the wavelengths and thereby acquiring a voltage at which the detection intensity of the light L1 reaches a peak, it is possible to acquire the relationship between the level of the applied voltage and the wavelength of the transmitted light for each of the Fabry-Perot interference filter portions 1A. Alternatively, by changing the level of the voltage applied to the Fabry-Perot interference filter portion 1A to change the wavelength of light L1 to be emitted at each of the voltages and thereby acquiring the wavelength at which the detection intensity of light L1 reaches a peak at each of the voltages, it is possible to acquire the relationship between the level of the voltage applied and the wavelength of the transmitted light for each of the Fabry-Perot interference filter portions 1A.

[Voltage Application Method]

The following is a voltage application method implemented to acquire a relationship between the level of the applied voltage and the wavelength of the transmitted light.

For example, in a case where the light emission unit 520 is configured to simultaneously emit light L1 with a plurality of wavelengths and where the light detection unit 530 is configured to detect the light L1 with the plurality of wavelengths for each of the wavelengths similarly to the optical inspection device 500 of the first embodiment and the second embodiment, it is possible to prevent occurrence of sticking (a phenomenon of stoppage of the second mirror portion 32 due to contact with the first mirror portion 31) by acquisition of the relationship between the level of the applied voltage and the wavelength of the transmitted light for the Fabry-Perot interference filter portion 1A by using the procedure as follows.

First, a reference lower limit is set on the basis of a lower limit of a wavelength range (designed wavelength range) that is to be transmitted through the Fabry-Perot interference filter portion 1A. The reference lower limit is a value obtained by subtracting a predetermined value from the lower limit of the designed wavelength range. For example, assuming that the predetermined value is 10 nm, the reference lower limit will be 1540 nm when the designed wavelength range is 1550 nm to 1850 nm. Subsequently, the level of the voltage applied to the Fabry-Perot interference filter portion 1A is increased stepwise. When the voltage level is increased stepwise, the distance between the first mirror portion 31 and the second mirror portion 32 facing each other decreases stepwise, and the wavelength of the light transmitted through the Fabry-Perot interference filter portion 1A is decreased stepwise.

When the level of the voltage applied to the Fabry-Perot interference filter portion 1A is increased stepwise, a wavelength at which the detection intensity of the light L1 reaches a peak (hereinafter, referred to as a "peak wavelength") is acquired at each of the voltage levels. At this time, at a predetermined voltage, the peak wavelength obtained at that voltage is compared with a reference lower limit. Thereafter, when the peak wavelength is shorter than the reference lower limit, the stepwise increase in the voltage level is terminated at that point, and then the acquisition of the relationship between the level of the applied voltage and the wavelength of the transmitted light is terminated. In contrast, when the peak wavelength is longer than the reference lower limit, the level of the voltage applied to the Fabry-Perot interference filter portion 1A is increased by one step, and the peak wavelength obtained at that voltage level is compared with the reference lower limit.

In other words, this is a voltage application method implemented when the light L1 with the plurality of wavelengths are simultaneously incident on the Fabry-Perot interference filter portion 1A, and the wavelength of the light. L transmitted through the Fabry-Perot interference filter portion 1A is detected and whereby the relationship between the level of the voltage applied to the Fabry-Perot interference filter portion 1A and the wavelength of the light transmitted through the Fabry-Perot interference filter portion 1A is acquired, the voltage application method including: a step of setting a reference lower limit on the basis of the lower limit of the wavelength range scheduled to be transmitted through the Fabry-Perot interference filter portion 1A; a step of increasing the level of the voltage applied to the Fabry-Perot interference filter portion 1A stepwise to acquire a peak wavelength every time at each of voltage levels, and comparing, at a predetermined voltage, the peak wavelength obtained at that voltage with the reference lower limit; and a step, that is to be performed when the peak is shorter than the reference lower limit, of terminating the stepwise increase of the level of the voltage at that point and then terminating the acquisition of the relationship between the level of the applied voltage and the wavelength of the transmitted light, and the step, that is to be performed when the peak wavelength is longer than the reference lower limit, of increasing the level of the voltage applied to the Fabry-Perot interference filter portion 1A by one step and then comparing the peak wavelength obtained at that voltage with the reference lower limit. With this method, it is possible to prevent occurrence of sticking at acquisition of the relationship between the level of the applied voltage and the wavelength of the transmitted light. This voltage application method may be applied not only to the Fabry-Perot interference filter portion 1A in the state of the wafer 100 but also to each of Fabry-Perot interference filters 1.

Furthermore, in a case where the light emission unit 520 is configured to emit light L1 with a plurality of wavelengths for each of the wavelengths and where the light detection unit 530 is configured to have sensitivity to the light L1 with the plurality of wavelengths similarly to the optical inspection device 500 of the third embodiment, the fourth embodiment, and the fifth embodiment, it is possible to prevent occurrence of sticking by acquisition of the relationship between the level of the applied voltage and the wavelength of the transmitted light regarding the Fabry-Perot interference filter portion 1A by using the procedure as follows.

First, the wavelength of the light L1 incident on the Fabry-Perot interference filter portion 1A is changed stepwise. At that time, the level of the voltage applied to the Fabry-Perot interference filter portion 1A is changed at a first pitch (for example, 100 mV) at each of wavelengths, thereby acquiring the voltage at which the detection intensity of the light L1 reaches a peak (hereinafter, referred to as a "first peak voltage"). Subsequently, the level of the voltage applied to the Fabry-Perot interference filter portion 1A is changed in a voltage range including a first peak voltage (for example, a voltage range of the first peak voltage ±200 mV) by a second pitch (for example, 5 mV) smaller than the first pitch, thereby acquiring a voltage at which the detection intensity of the light L1 reaches a peak (hereinafter, referred to as a "second peak voltage"). The voltage range including the first peak voltage may be set to ±"predetermined multiple of the first pitch (for example, twice)", or ±"predetermined value (for example, ±200 mV)" regardless of the first pitch. In this manner, the acquisition of the first peak voltage and the acquisition of the second peak voltage based on the first peak voltage are performed at each of wavelengths, thereby acquiring the relationship between the level of the applied voltage and the wavelength of the transmitted light for the Fabry-Perot interference filter portion 1A.

That is, this is a voltage application method implemented when the light L1 with the plurality of wavelengths are caused to be incident on the Fabry-Perot interference filter portion 1A for each of the wavelengths and then a voltage at which the detection intensity of the light L1 transmitted through the Fabry-Perot interference filter portion 1A reaches a peak is detected at each of the wavelengths and whereby the relationship between the level of the voltage applied to the Fabry-Perot interference filter portion 1A and the wavelength of the light transmitted through the Fabry-Perot interference filter portion 1A is acquired. The voltage application method includes: a step of causing the light L1 of the first wavelength to be incident on the Fabry-Perot interference filter portion 1A and acquiring the first peak voltage by changing the level of the voltage applied to the Fabry-Perot interference filter portion A at the first pitch and then acquiring a second peak voltage by changing the level of the voltage applied to the Fabry-Perot interference filter portion 1A at a second pitch smaller than the first pitch in a voltage range including the first peak voltage; and a step of causing the light L1 of a second wavelength different from the first wavelength to be incident on the Fabry-Perot interference filter portion 1A and acquiring the first peak voltage by changing the level of the voltage applied to the Fabry-Perot interference filter portion 1A at the first pitch and then acquiring the second peak voltage by changing the level of the voltage applied to the Fabry-Perot interference filter portion 1A at the second pitch smaller than the first pitch in a voltage range including the first peak voltage. With this method, it is possible to prevent occurrence of sticking at acquisition of the relationship between the level of the applied voltage and the wavelength of the transmitted light. This voltage application method may be applied not only to the Fabry-Perot interference filter portion 1A in the state of the wafer 100 but also to each of Fabry-Perot interference filters 1.

Note that when the level of the applied voltage is to be changed at the first pitch in each of wavelengths, a voltage range in which the first peak voltage is predicted to be detected may be set in advance, and the level of the voltage to be applied may be changed at the first pitch within the voltage range. In addition, when the level of the voltage to be applied is increased stepwise at the first pitch, it is allowable, after a voltage at which the detection intensity of the light L1 reaches a peak is obtained, to set a limitation on the voltage so that the stepwise increase of the voltage within a predetermined voltage range at the first pitch will stop within a predetermined range from the acquired voltage.

[Configuration of Wafer Support Unit According to Modification]

Next, a configuration of a modification of the wafer support unit 510 applicable to the optical inspection device 500 of the first to fifth embodiments will be described. The wafer support unit 510 illustrated in (a) of FIG. 20 is different from the wafer support unit 510 illustrated in FIG. 15 in that a light transmitting member 515 is disposed in the opening 513 of the stage 511. The wafer support unit 510 illustrated in (b) of FIG. 20 is different from the wafer support unit 510 illustrated in FIG. 15 in that the step portion 514 is not formed on the first surface 511a of the stage 511 and that the light transmitting member 515 is disposed within the opening 513 of the stage 511. The light transmitting member 515 is formed of a material that transmits the light L1 and is in contact with the effective area 101 of the wafer 100. Specifically, when viewed in a direction parallel to the reference line RL, the light transmitting member 515 includes the effective area 101. The light transmitting member 515 functions as the light passage region 512 that allows the light L1 to pass along the reference line RL. That is, the wafer support unit 510 may include the light transmitting member 515 defined as the light passage region 512.

[Method of Manufacturing Fabry-Perot Interference Filter]

Figure 21:
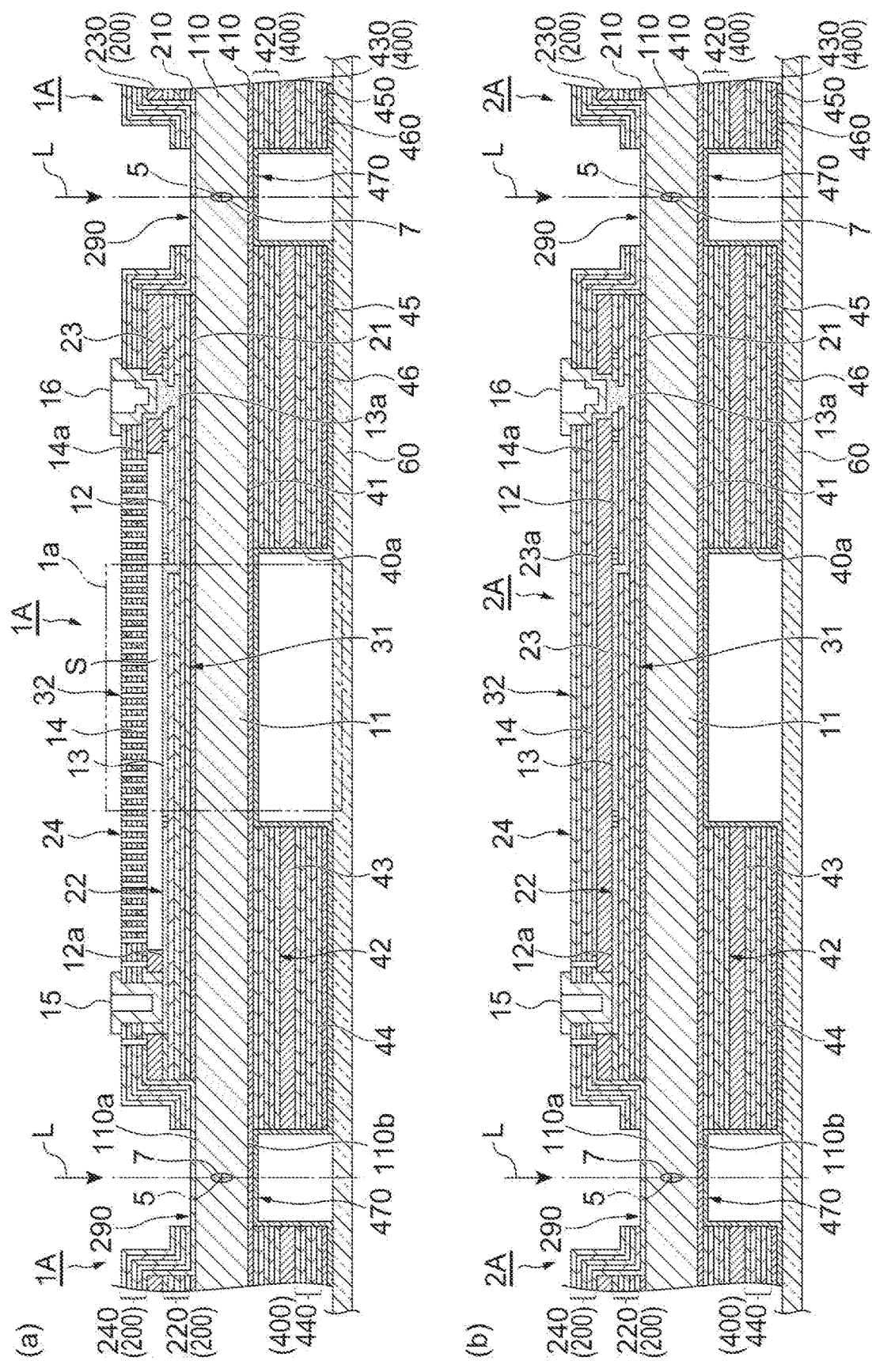
FIG. 21 is a cross-sectional view illustrating a method for cutting out a Fabry-Perot interference filter from the wafer illustrated in FIG. 5.
Figure 22:
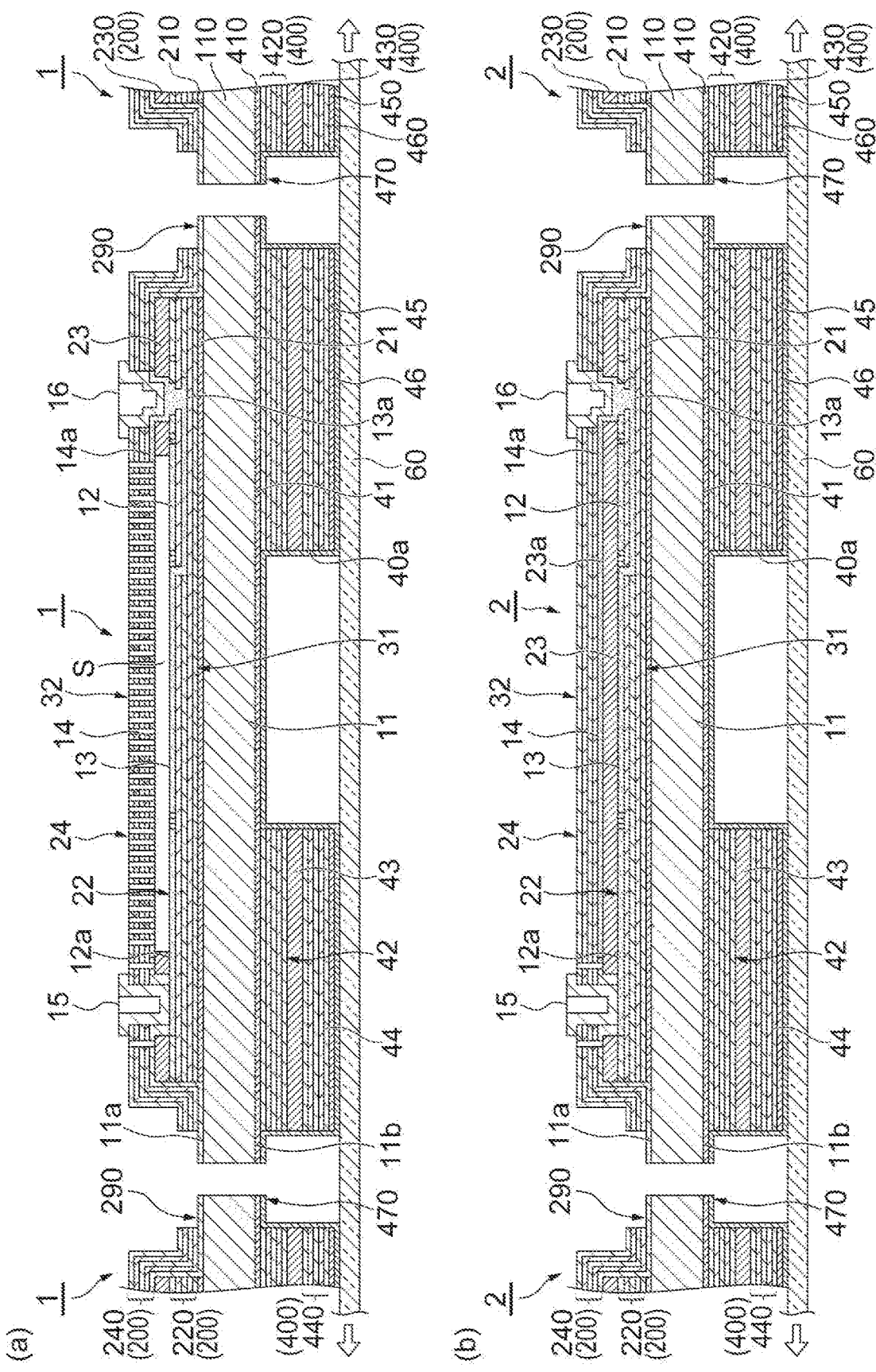
FIG. 22 is a cross-sectional view illustrating a method for cutting out a Fabry-Perot interference filter from the wafer illustrated in FIG. 5.

Next, a method for cutting out the Fabry-Perot interference filter 1 from the wafer 100 (a method of manufacturing the Fabry-Perot interference filter 1) will be described with reference to FIGS. 21 and 22. In FIGS. 21 and 22, (a) is cross-sectional view of a portion corresponding to the Fabry-Perot interference filter portion 1A, and (b) is a cross-sectional view of a portion corresponding to the dummy filter portion 2A.

First, as illustrated in FIG. 21, an expanding tape 60 is attached onto the protective layer 460 (that is, to the second surface 110b side). Subsequently, laser light L is applied from a side opposite to the expanding tape 60 in a state where the expanding tape 60 is attached to the second surface 110b side, and then a converging point of the laser light L is relatively moved along each of the lines 5 while a converging point of the laser light L is positioned within the substrate layer 110. That is, the laser light L is controlled to be incident on the substrate layer 110 from the side opposite to the expanding tape 60 through the surface of the polysilicon layer exposed in the first groove 290.

With the irradiation of the laser light L, a modified region 7 is formed within the substrate layer 110 along each of the lines 5. The modified region 7 is a region having physical characteristics such as density, a refractive index, mechanical strength different from those in the surrounding area, and is a region to be a start point of a fracture extending in a thickness direction of the substrate layer 110. Examples of the modified region 7 include molten processed regions (which means at least any one of a region resolidified after melting, a region in a melted state, and a region in a state of being resolidified from the melted state), a crack region, a dielectric breakdown region, a refractive index changed region, or the like, or a mixed region of these. Further examples of the modified region 7 include a region where the density of the modified region 7 has changed from that of an unmodified region, a region with a lattice defect, or the like, in the material of the substrate layer 110. When the material of the substrate layer 110 is monocrystalline silicon, the modified region 7 can also be defined as a high-dislocation density region. The number of rows of the modified regions 7 arranged in the thickness direction of the substrate layer 110 with respect to each of the lines 5 is appropriately adjusted based on the thickness of the substrate layer 110.

Subsequently, as illustrated in FIG. 22, the expanding tape 60 attached to the second surface 110b side is expanded so as to extend the fracture in the thickness direction of the substrate layer 110 from the modified region 7 formed within the substrate layer 110, and then, the substrate layer 110 is cut into the plurality of substrates 11 along each of the lines 5. At this time, the polysilicon layer of the second mirror layer 240 is cut along each of the lines 5 in the first groove 290, while the reflection prevention layer 410 and the protective layer 460 are cut along each of the lines 5 in the second groove 470. With this procedure, a plurality of Fabry-Perot interference filters 1 and the plurality of dummy filters 2 in a state of being separated from each other on the expanding tape 60 are obtained.

[Configuration of Light Detection Device]

Figure 23:
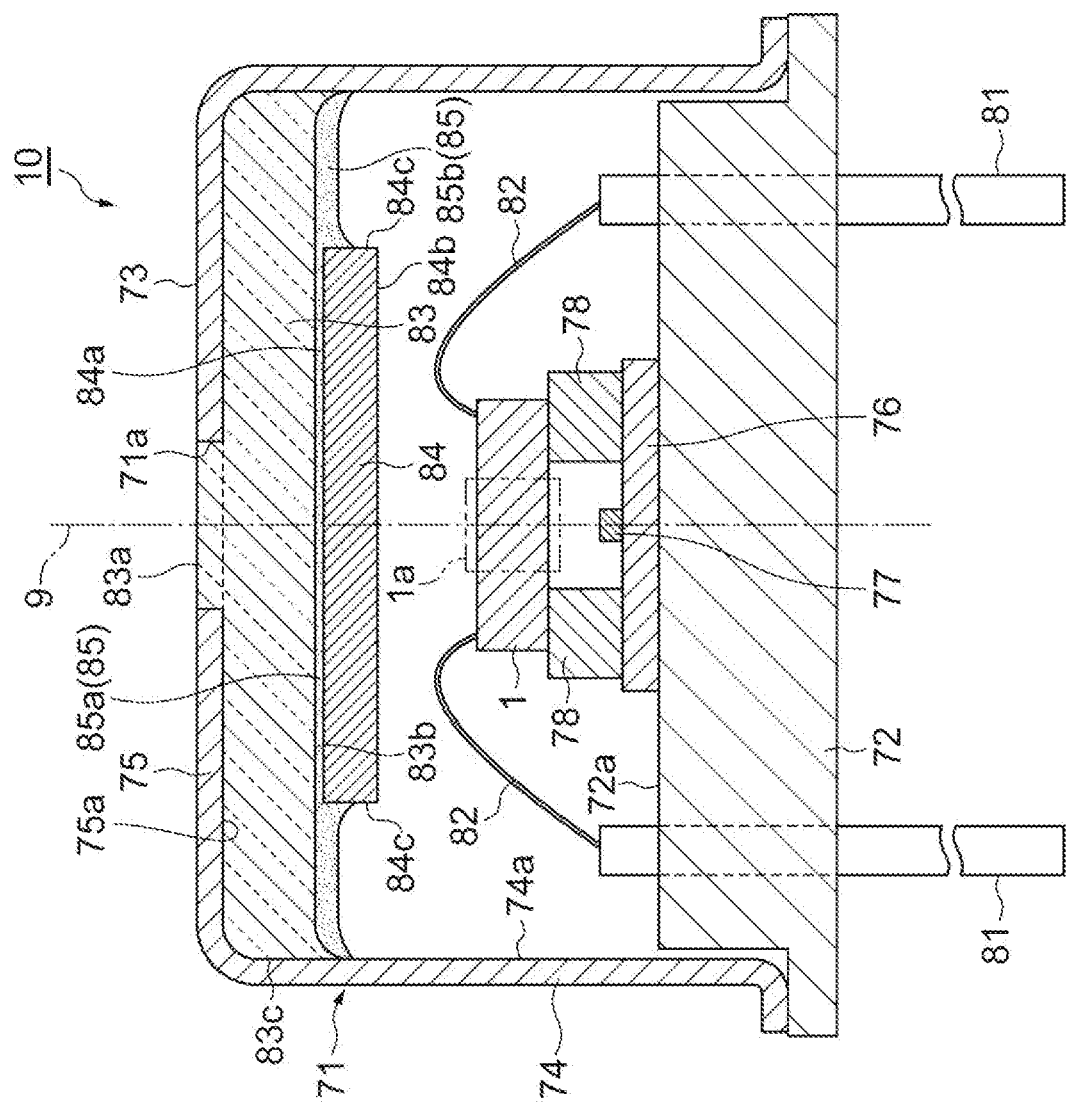
FIG. 23 is a cross-sectional view of a light detection device including a Fabry-Perot interference filter.

Next, a configuration of the light detection device 10 including the Fabry-Perot interference filter 1 will be described. As illustrated in FIG. 23, the light detection device 10 includes a package 71. The package 71 is a CAN package including a stem 72 and a cap 73. The cap 73 is integrally formed by a side wall 74 and a top wall 75. The stem 72 and the cap 73 are formed of a metal material and are hermetically joined to each other. In the package 71 formed of a metal material, the shape of the side wall 74 is cylindrical about a line 9 as a center line. The stem 72 and the top wall 75 face each other in a direction parallel to the line 9, and close both ends of the side wall 74, individually.

A wiring substrate 76 is secured to an inner surface 72a of the stem 72. Examples of a material applicable as the wiring substrate 76 include silicon, ceramic, quartz, glass, plastic, or the like. The light detector (light detection unit) 77 and a temperature detector (not illustrated) such as a thermistor are mounted on the wiring substrate 76. The light detector 77 is disposed on the line 9. More specifically, the light detector 77 is disposed such that the center line of a light receiving portion thereof is aligned with the line 9. The light detector 77 is an infrared detector such as a quantum type sensor using InGaAs or other compounds or a thermal type sensor using a thermopile or a bolometer or the like. In a case of detecting light of different wavelength bands of ultraviolet, visible, and near infrared regions, for example a silicon photodiode or the like can be used as the light detector 77. Note that the light detector 77 may include one light receiving portion, or a plurality of light receiving portions provided in an array. Furthermore, a plurality of light detectors 77 may be mounted on the wiring substrate 76. The temperature detector may be disposed at a position close to the Fabry-Perot interference filter 1, for example, so that a temperature change of the Fabry-Perot interference filter 1 can be detected.

A plurality of spacers 78 is secured onto the wiring substrate 76. Examples of a material applicable as the spacers 78 include silicon, ceramic, quartz, glass, plastic, or the like. The Fabry-Perot interference filter 1 is secured onto the plurality of spacers 78 by adhesive, for example. Fabry-Perot interference filter 1 is disposed on the line 9. More specifically, the Fabry-Perot interference filter 1 is disposed such that the center line of the light transmission region 1a is aligned with the line 9. Note that the spacers 78 may be integrally formed with the wiring substrate 76. The Fabry-Perot interference filter 1 may be supported by a single spacer 78, rather than by the plurality of spacers 78.

A plurality of lead pins 81 is secured to the stem 72. More specifically, each of the lead pins 81 penetrates through the stem 72 in a state where electrical insulation and hermeticity with the stem 72 are maintained. Each of the lead pins 81 is electrically connected by wires 82 to each of electrode pads provided on the wiring substrate 76, a terminal of the light detector 77, a terminal of the temperature detector, and a terminal of the Fabry-Perot interference filter 1. The light detector 77, the temperature detector, and the Fabry-Perot interference filter 1 may be electrically connected to each of the lead pins 81 via the wiring substrate 76. For example, each of terminals may be electrically connected to an electrode pad provided on the wiring substrate 76, while the electrode pad and each of the lead pins 81 may be connected by the wire 82. This enables input and output of electric signals to and from each of the light detector 77, the temperature detector, and the Fabry-Perot interference filter 1.

The package 71 has an opening 71a. More specifically, the opening 71a is formed in the top wall 75 of the cap 73 such that the center line thereof is aligned with the line 9. The shape of the opening 71a is circular when viewed in a direction parallel to the line 9. A light transmitting member 83 is disposed on an inner surface 75a of the top wall 75 so as to close the opening 71a. The light transmitting member 83 is hermetically joined to the inner surface 75a of the top wall 75. The light transmitting member 83 has a light incident surface 83a and a light emission surface 83b (inner surface) opposite to the light incident surface 83a in a direction parallel to line 9, and has side surfaces 83c. The light incident surface 83a of the light transmitting member 83 is substantially flush with an outer surface of the top wall 75 at the opening 71a. The side surface 83c of the light transmitting member 83 is in contact with an inner surface 74a of the side wall 74 of the package 71. That is, the light transmitting member 83 reaches the inside of the opening 71a and the inner surface 74a of the side wall 74. Such a light transmitting member 83 is formed by disposing a glass pellet inside the cap 73 with the opening 71a facing down and melting the glass pellet. That is, the light transmitting member 83 is formed of fused glass.

A band pass filter 84 is secured to the light emission surface 83b of the light transmitting member 83 by a bonding member 85. That is, the bonding member 85 secures the band pass filter 84 to the inner surface 75a of the top wall 75 via the light transmitting member 83 joined to the inner surface 75a of the top wall 75. The band pass filter 84 selectively transmits light with a measurement wavelength range by the light detection device 10 (light with a predetermined wavelength range and should be incident on the light transmission region 1a of the Fabry-Perot interference filter 1) out of the light transmitted through the light transmitting member 83 (that is, the band pass filter 84 transmits only the light with the wavelength range). The band pass filter 84 has a rectangular plate shape. More specifically, the band pass filter 84 has a light incident surface 84a and a light emission surface 84b opposite to the light incident surface 84a in a direction parallel to the line 9, and has four side surfaces 84c. The band pass filter 84 is obtained by forming a dielectric multilayer film (for example, a multilayer film combining a high refractive material such as $TiO_2$, $Ta_2O_5$, or the like and a low refractive material such as $SiO_2$, $MgF_2$, or the like) on a surface of a light transmitting member formed in a rectangular shape using a light transmitting material (for example, silicon, glass, or the like).

The bonding member 85 includes a first portion 85a arranged over the entire region of the light incident surface 84a of the band pass filter 84. That is, the first portion 85a in the bonding member 85 is a portion arranged between the light emission surface 83b of the light transmitting member 83 and the light incident surface 84a of the band pass filter 84 facing each other. The bonding member 85 further includes a second portion 85b protruding outward from the outer edge of the band pass filter 84 when viewed in a direction parallel to the line 9. The second portion 85b reaches the inner surface 74a of the side wall 74 and is in contact with the inner surface 74a of the side wall 74. Furthermore, the second portion 85b is in contact with the side surface 84c of the band pass filter 84.

In the light detection device 10 configured as described above, when light is incident on the band pass filter 84 from outside via the opening 71a, the light transmitting member 83, and the bonding member 85, light with a predetermined wavelength range is selectively transmitted. When the light transmitted through the band pass filter 84 is incident on the light transmission region 1a of the Fabry-Perot interference filter 1, light with a predetermined wavelength out of the light with the predetermined wavelength range is selectively transmitted. The light transmitted by the light transmission region 1a of the Fabry-Perot interference filter 1 is incident on the light receiving portion of the light detector 77 and is detected by the light detector 77. That is, the light detector 77 converts the light transmitted through the Fabry-Perot interference filter 1 into an electric signal and outputs the electric signal. For example, the light detector 77 outputs an electric signal of a strength corresponding to the intensity of the light incident on the light receiving portion.

[Operation and Effect of Optical Inspection Device and Optical Inspection Method]

This optical inspection device 500 according to the first and fifth embodiments inspects light transmission characteristics of a plurality of Fabry-Perot interference filter portions 1A to be a plurality of Fabry-Perot interference filters 1, in a state of the wafer 100. This enables the optical inspection device 500 according to the first and fifth embodiments to obtain a plurality of Fabry-Perot interference filters 1 with high efficiency and with high yield. The reason is as follows. The Fabry-Perot interference filter 1 is an element in which characteristics are likely to change during individual processes from being cut out from a wafer 100 to being assembled onto a light detection device 10, for example. Therefore, inspection of the characteristics of the Fabry-Perot interference filter 1 is considered to be necessary during the final assembly. On the other hand, the present inventors have found that the Fabry-Perot interference filter portion 1A once being a non-faulty product in the state of the wafer 100 is unlikely to be a faulty Fabry-Perot interference filter 1 even with a subsequent change in characteristics. Therefore, by inspecting the light transmission characteristics of each of Fabry-Perot interference filter portions 1A in the state of wafer 100, it is possible to increase the probability of bringing a non-faulty Fabry-Perot interference filter 1 to the final assembly stage while eliminating the waste that the Fabry-Perot interference filter 1 that is faulty in the state of wafer 100 is brought to the final assembly stage.

In addition, this optical inspection device 500 according to the first to fifth embodiments enables inspection of the light transmission characteristics of each of Fabry-Perot interference filter portions 1A with high efficiency and high accuracy. The reason is as follows. In a Fabry-Perot interference filter 1, the wavelength of transmitted light changes depending on the incident angle. Therefore, in order to inspect the light transmission characteristics of each of Fabry-Perot interference filters 1, it would be necessary to adjust the support angle for each of the Fabry-Perot interference filters 1. By inspecting the light transmission characteristics of each of the Fabry-Perot interference filter portions 1A in the state of wafer 100, the burden of such adjustment can be reduced. Furthermore, the wavelength of light transmitted through the Fabry-Perot interference filter 1 changes depending on environmental conditions such as temperature. Therefore, when the light transmission characteristics are inspected for each of the Fabry-Perot interference filters 1, the environmental conditions being the basis of inspection results are likely to vary between the individual Fabry-Perot interference filters 1. By inspecting the light transmission characteristics of each of the Fabry-Perot interference filter portions 1A in the state of the wafer 100, inspection results can be obtained under stable environmental conditions.

Furthermore, in the optical inspection device 500 according to the first to fifth embodiments, the wafer support unit 510 has the opening 513 facing the effective area 101 of the wafer 100, defined as the light passage region 512. With this configuration, it is possible to transmit light along the reference line RL to each of the Fabry-Perot interference filter portions 1A of the wafer 100 supported by the wafer support unit 510 while simplifying the configuration of the wafer support unit 510.

Furthermore, in the optical inspection device 500 according to the first to fifth embodiments, the wafer support unit 510 may include the light transmitting member 515 that is in contact with the effective area 101 of the wafer 100, as the light passage region 512. With this configuration, it is possible to transmit light along the reference line RL to each of the Fabry-Perot interference filter portions 1A of the wafer 100 supported by the wafer support unit 510 while suppressing the warpage of the wafer 100.

Furthermore, the optical inspection device 500 according to the first to fifth embodiments further include a voltage application unit 540 configured to apply a voltage to each of the Fabry-Perot interference filter portions 1A so as to change the distance between the first mirror portion 31 and the second mirror portion 32 facing each other. With this configuration, it is possible to obtain a relationship between the level of the applied voltage and the wavelength of the transmitted light for each of the Fabry-Perot interference filter portions 1A.

Furthermore, in the optical inspection device 500 according to the first and second embodiments, the light emission unit 520 is configured to simultaneously emit light L1 with a plurality of wavelengths, and the light detection unit 530 is configured to detect the light L1 with the plurality of wavelengths, for each of the wavelengths. With this configuration, by changing the level of the voltage applied to the Fabry-Perot interference filter portion 1A and thereby acquiring the wavelength at which the detection intensity of light L1 reaches a peak at each of voltages, it is possible to acquire the relationship between the level of the voltage applied and the wavelength of the transmitting light for each of the Fabry-Perot interference filter portions 1A.

Furthermore, in the optical inspection device 500 according to the third, fourth, and fifth embodiments, the light emission unit 520 is configured to emit light L1 with a plurality of wavelengths for each of the wavelengths, and the light detection unit 530 is configured to have sensitivity to the light L1 with the plurality of wavelengths. With this configuration, by changing the wavelength of the light L1 to be emitted to change the level of the voltage applied to the Fabry-Perot interference filter portion 1A at each of the wavelengths and thereby acquiring a voltage at which the detection intensity of the light L1 reaches a peak, it is possible to acquire the relationship between the level of the applied voltage and the wavelength of the transmitted light for each of the Fabry-Perot interference filter portions 1A. Alternatively, by changing the level of the voltage applied to the Fabry-Perot interference filter portion 1A to change the wavelength of light L1 to be emitted at each of the voltages and thereby acquiring the wavelength at which the detection intensity of light L1 reaches a peak at each of the voltages, it is possible to acquire the relationship between the level of the voltage applied and the wavelength of the transmitted light for each of the Fabry-Perot interference filter portions 1A.

Furthermore, the optical inspection device 500 according to the first to fifth embodiments includes the imaging unit 550 that images the wafer 100 supported by the wafer support unit 510. This makes it possible to acquire coordinate information of each of Fabry-Perot interference filter portions 1A and possible to position each of the Fabry-Perot interference filter portions 1A on the reference line RL on the basis of the acquired coordinate information.

Furthermore, an optical inspection method implemented in the optical inspection device 500 according to the first to fifth embodiments includes: a step of preparing the wafer 100 having the plurality of Fabry-Perot interference filter portions 1A in which the distance between the first mirror portion 31 and the second mirror portion 32 facing each other changes by an electrostatic force; a step of emitting light to be incident on each of the Fabry-Perot interference filter portions 1A in the facing direction; and a step of detecting the light transmitted through each of the plurality of Fabry-Perot interference filter portions 1A in the facing direction. This enables the optical inspection method to obtain a plurality of Fabry-Perot interference filters 1 with high efficiency and with high yield for the reason similar to the case of the optical inspection device 500 according to the first to fifth embodiments described above.

The above-described optical inspection method further includes a step of applying a voltage to each of the plurality of Fabry-Perot interference filter portions 1A so as to change the distance between the first mirror portion 31 and the second mirror portion 32 facing each other. With this configuration, it is possible to obtain a relationship between the level of the applied voltage and the wavelength of the transmitted light for each of the Fabry-Perot interference filter portions 1A.

The above-described optical inspection method further includes a step of imaging the wafer 100. This makes it possible to acquire coordinate information of each of the Fabry-Perot interference filter portions 1A and possible to position each of the Fabry-Perot interference filter portions 1A on the reference line RL on the basis of the acquired coordinate information in a case where the light L1 is to be incident on each of the Fabry-Perot interference filter portions 1A along the reference line RL.

In the wafer 100, the plurality of Fabry-Perot interference filter portions 1A to be the plurality of Fabry-Perot interference filters 1 is provided in the effective area 101. In addition, the plurality of dummy filter portions 2A is provided in the dummy area 102 provided along the outer edge 110c of the substrate layer 110 to surround the effective area 101, and the intermediate layer 23 is provided between the first mirror portion 31 and the second mirror portion 32 facing each other in each of the dummy filter portions 2A. This configuration sufficiently ensures the strength of the entire wafer 100. This facilitates handling of the wafer 100 when the above-described optical inspection method is implemented on each of Fabry-Perot interference filter portions 1A. Furthermore, since it is possible to suppress warpage of the wafer 100, the light L1 can be incident on each of Fabry-Perot interference filter portions 1A at an appropriate incident angle without excessively adjusting the support angle of the wafer 100. Furthermore, the pair of probe needles 543 can be reliably brought into contact with the pair of terminals 15 and 16 of each of the Fabry-Perot interference filter portions 1A.

Moreover, according to the method of manufacturing the wafer 100, the gap S is formed in each of the Fabry-Perot interference filter portions 1A while the plurality of Fabry-Perot interference filter portions 1A is still in the state of the wafer 100. Accordingly, compared to a case of forming the gap S individually at a chip level, it is possible to form the gap S between the first mirror portion 31 and the second mirror portion 32 with significantly higher efficiency. Furthermore, since a process proceeds simultaneously in the effective area 101 at a portion corresponding to an arbitrary substrate 11 within the substrate layer 110 and portions corresponding to the surrounding substrates around the substrate 11, such as in the etching of the intermediate layer 230 simultaneously performed onto the plurality of two-dimensionally arranged portions 50 expected to be removed, it is possible to reduce an unevenness of in-plane stress in the substrate layer 110. Therefore, according to the method of manufacturing the wafer 100, it is possible to obtain the wafer 100 capable of performing stable mass-production of high-quality Fabry-Perot interference filters 1.

Furthermore, irradiation of the laser light L to form the modified region 7 inside the substrate layer 110 along each of the lines 5 and thereby cutting the wafer 100 along each of the lines 5 will be extremely effective in manufacturing the Fabry-Perot interference filter 1 for the following reasons. That is, cutting the wafer 100 using the laser light L needs no water and thus can suppress an incidence of damage onto the second mirror portion 32 floating on the gap S by water pressure and suppress sticking (phenomenon of stoppage of the second mirror portion 32 due to contact with the first mirror portion 31) caused by water intrusion into the gap S. Therefore, cutting the wafer 100 using the laser light L is extremely effective in manufacturing the Fabry-Perot interference filter 1.

[Modifications]

Although an embodiment of the present disclosure has been described as above, the present disclosure is not limited to the embodiment described above. For example, the material and the shape of each configuration are not limited to the materials and the shapes described above, and it is possible to employ various materials and shapes. In the wafer 100, when viewed in the thickness direction of the substrate layer 110, the outer shape of the Fabry-Perot interference filter portion 1A and the outer shape of the dummy filter portion 2A need not be the same. Furthermore, when cutting out a plurality of Fabry-Perot interference filters 1 from the wafer 100, there is no need to cut out all the dummy filter portions 2A (that is, it is not necessary to singulate all the dummy filter portions 2A). Furthermore, the configuration of the dummy area 102 is not limited to the above. For example, in a region corresponding to the dummy area 102, at least the second mirror portion 32 need not be surrounded by the first groove 290 that is annularly continuous (for example, the first groove 290 may simply cross a region corresponding to the dummy area 102), or the first groove 290 need not be formed in the device layer 200. Furthermore, in a region corresponding to the dummy area 102, a portion of the device layer 200 or the entire device layer 200 need not be provided. That is, the dummy area is not an essential configuration in the wafer as an inspection target of the present disclosure.

In the optical inspection device 500 and the optical inspection method performed in each of the optical inspection device 500 according to the first to fifth embodiments, the voltage is applied to the Fabry-Perot interference filter portion 1A so as to change the distance between the first mirror portion 31 and the second mirror portion 32 facing each other and the light L1 transmitted through the Fabry-Perot interference filter portion 1A is detected in this state. Alternatively, however, the light L1 that has been transmitted through the Fabry-Perot interference filter portion 1A may be detected in a state where no voltage is applied to the Fabry-Perot interference filter portions 1A. In that case, it is also possible determine whether the Fabry-Perot interference filter portion 1A is a non-faulty product including whether the second mirror portion 32 is normal in the Fabry-Perot interference filter portion 1A on the basis of a detection result of the light L1 transmitted through the Fabry-Perot interference filter portion 1A.

Furthermore, as illustrated in FIG. 21, the wafer 100 may include the modified region 7 formed inside the substrate layer 110 so as to correspond to the first groove 290. Here, forming the modified region 7 so as to correspond to the first groove 290 means that the modified region 7 is formed to overlap the first groove 290 when viewed in the facing direction, and in particular, means the modified region 7 is formed along each of the lines 5. This enables the fracture to be extended from the modified region 7 in a thickness direction of the substrate layer 110, making it possible to easily and accurately cut out a plurality of Fabry-Perot interference filters 1 from the wafer 100. In this case, the expanding tape 60 may be attached to the second surface 110b side of the substrate layer 110. At this time, the outer edge portion of the expanding tape 60 attached to the wafer 100 is held by an annular frame. This facilitates handling of the wafer 100 even in a state where the modified region 7 is formed inside the substrate layer 110. In the wafer 100 in which the modified region 7 is formed inside the substrate layer 110, there is a possibility that a fracture would unexpectedly extend from the modified region 7. In the wafer 100, the plurality of dummy filter portions 2A, the first groove 290, and the second groove 470 are not provided in the pair of areas 102a of the dummy area 102. This can suppress the occurrence of a fracture and even when a fracture develops, the extension of the fracture would be stopped by the pair of areas 102a.

Figure 24:
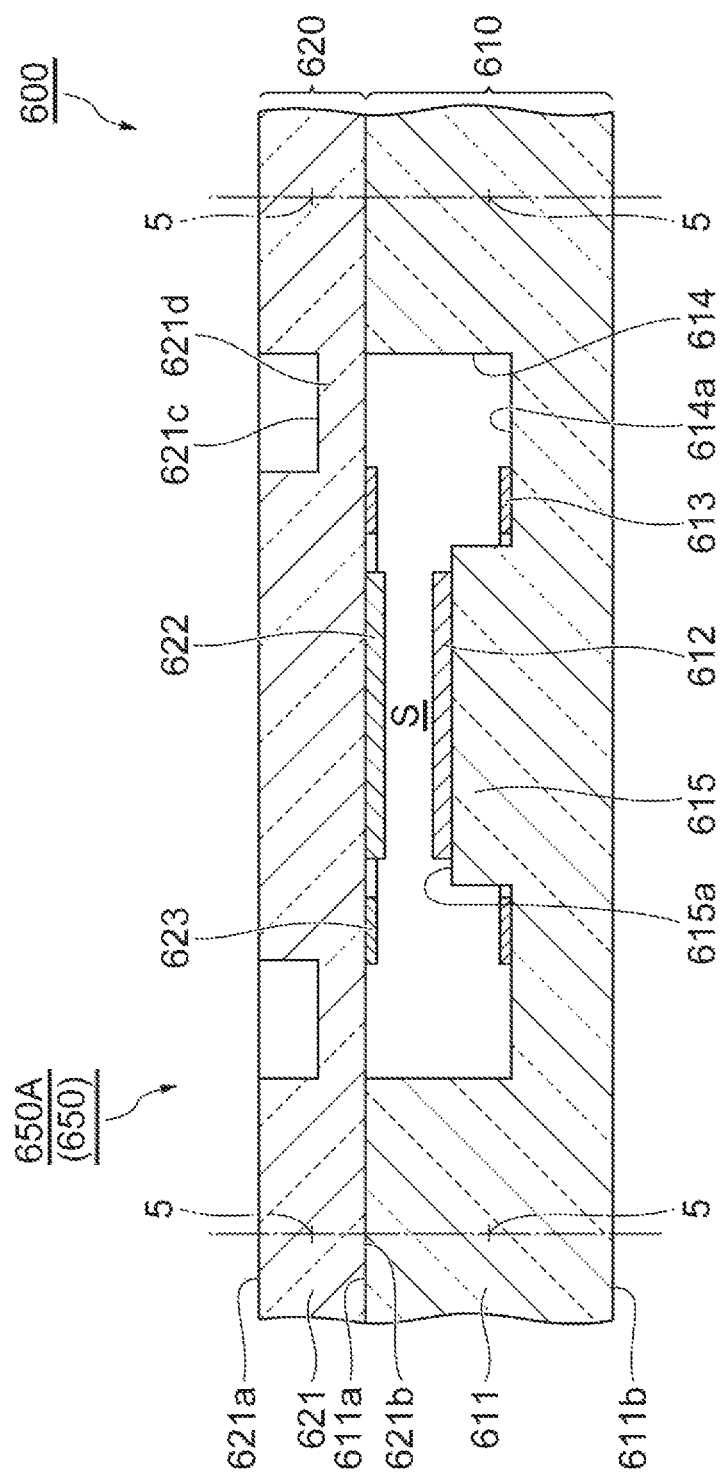
FIG. 24 is a cross-sectional view of a wafer according to a modification.

Furthermore, as illustrated in FIG. 24, a wafer 600 formed by bonding a first wafer 610 and a second wafer 620 may be defined as the inspection target. The wafer 600 includes a plurality of Fabry-Perot interference filter portions 650A. Each of the plurality of Fabry-Perot interference filter portions 650A is to be each of a plurality of Fabry-Perot interference filters 650 when the wafer 600 is cut along each of lines 5 set on each of the first wafer 610 and the second wafer 620. The plurality of Fabry-Perot interference filter portions 650A is two-dimensionally arranged when viewed in the thickness direction of the wafer 600.

The first wafer 610 includes a substrate layer 611, a plurality of first mirror portions 612, and a plurality of drive electrodes 613. The substrate layer 611 includes a surface 611a and a surface 611b opposite to the surface 611a. The substrate layer 611 is formed of a light transmitting material. Each of the first mirror portions 612 is a metal film, a dielectric multilayer film, or a composite film thereof, for example. The drive electrode 613 is formed of a metal material, for example.

The second wafer 620 includes a substrate layer 621, a plurality of second mirror portions 622, and a plurality of drive electrodes 623. The substrate layer 621 includes a surface 621a and a surface 621b opposite to the surface 621a. The substrate layer 621 is formed of a light transmitting material. Each of the second mirror portions 622 is a metal film, a dielectric multilayer film, or a composite film thereof, for example. The drive electrode 623 is formed of a metal material, for example.

In the wafer 600, one Fabry-Perot interference filter portion 650A includes one first mirror portion 612, one drive electrode 613, one second mirror portion 622, and one drive electrode 623. Hereinafter, the configuration of the wafer 600 will be described focusing on the one Fabry-Perot interference filter portion 650A.

A recess 614 is formed on the surface 611a of the substrate layer 611. A protrusion 615 is provided on a bottom surface 614a of the recess 614. The height of the protrusion 615 is less than the depth of the recess 614. That is, an end surface 615a of the protrusion 615 is at a recessed level with respect to the surface 611a of the substrate layer 611. The first mirror portion 612 is provided on the end surface 615a of the protrusion 615. The drive electrode 613 is provided on the bottom surface 614a of the recess 614 so as to surround the protrusion 615. The drive electrode 613 is electrically connected to an electrode pad (not illustrated) via wiring (not illustrated) provided on the substrate layer 611, for example. The electrode pad is provided in a region of the substrate layer 611 that can be accessed from the outside, for example.

The surface 621b of the substrate layer 621 is joined to the surface 611a of the substrate layer 611 by a plasma polymerized film, for example. On the surface 621b of the substrate layer 621, the second mirror portion 622 and the drive electrode 623 are provided. The second mirror portion 622 faces the first mirror portion 612 via the gap S. The drive electrode 623 is provided on the surface 621b of the substrate layer 621 so as to surround the second mirror portion 622 and faces the drive electrode 613 via the gap S. The drive electrode 623 is electrically connected to an electrode pad (not illustrated), for example, via wiring (not illustrated) provided on the substrate layer 621. The electrode pad is provided in a region of the substrate layer 621 that can be accessed from the outside, for example.

A groove 621c is formed on the surface 621a of the substrate layer 621 so as to surround the second mirror portion 622 and the drive electrode 623 when viewed in the thickness direction of the wafer 600. The groove 621c extends in an annular shape. The portion of the substrate layer 621 surrounded by the groove 621c is displaceable in the thickness direction of the wafer 600 with the portion where the groove 621c is formed defined as a diaphragm-shaped holder 621d. In the diaphragm-shaped holder 621d, it is allowable to form a groove surrounding the second mirror portion 622 and the drive electrode 623 when viewed in the thickness direction of the wafer 600 on at least one of the surface 621a and the surface 621b of the substrate layer 621. Furthermore, it is also allowable to form the groove surrounding the first mirror portion 612 and the drive electrode 613 in the substrate layer 611 when viewed in the thickness direction of the wafer 600 so as to form the diaphragm-shaped holder in the substrate layer 611. Further alternatively, instead of the diaphragm-shaped holder, a holder may be formed by a plurality of beams arranged radially.

In the wafer 600 on which each of the Fabry-Perot interference filter portions 650A is formed as described above, when a voltage is applied between the drive electrode 613 and the drive electrode 623 in each of the Fabry-Perot interference filter portions 650A, an electrostatic force corresponding to the voltage is generated between the drive electrode 613 and the drive electrode 623. The portion of the substrate layer 621 surrounded by the groove 621c is attracted toward the substrate layer 611 side by the electrostatic force, thereby adjusting the distance between the first mirror portion 612 and the second mirror portion 622. This allows transmission of light having a wavelength corresponding to the distance between the first mirror portion 612 and the second mirror portion 622. The wafer (100, 600) as an inspection target in the present disclosure may include the substrate layer (110, 611) and the plurality of pairs two-dimensionally arranged on the substrate layer (110, 611), each of the plurality of pairs having a first mirror portion (31, 612) and a second mirror portion (32, 622) and may include the plurality of Fabry-Perot interference filter portions (1A, 650A), each of the plurality of Fabry-Perot interference filter portions (1A, 650A) in which the gap S is formed between the first mirror portion (31, 612) and the second mirror portion (32, 622) facing each other, whereby the distance between the first mirror portion (31, 612) and the second mirror portions (32, 622) facing each other changes by the electrostatic force.

REFERENCE SIGNS LIST 1A, 650A: Fabry-Perot interference filter portion, 31, 612: first mirror portion, 32, 622: second mirror portion, 100, 600: wafer, 101: effective area, 110, 611: substrate layer, 110a: first surface, 110b: second surface, 220: first mirror layer, 240: second mirror layer, 500: optical inspection device, 510: wafer support unit, 512: light passage region, 513: opening, 515: light transmitting member, 520: light emission unit, 530: light detection unit, 540: voltage application unit, 550: imaging unit, S: gap, RL: reference line.

The invention claimed is:
1. An optical inspection device comprising:
a wafer support unit configured to support a wafer including a substrate layer and a plurality of Fabry-Perot interference filter portions two-dimensionally arranged on the substrate layer, each of the plurality of Fabry-Perot interference filter portions of the wafer being an uncut Fabry-Perot interference filter having a first mirror portion and a second mirror portion facing each other with a gap formed between the first mirror portion and the second mirror portion facing each other and a distance between the first mirror portion and the second mirror portion facing each other varying by an electrostatic force, the wafer support unit configured to support the wafer such that, for each of the Fabry-Perot interference filter portions, a direction in which the first mirror portion and the second mirror portion face each other follows along a reference line;

a light emission unit configured to emit light to be incident on each of the plurality of Fabry-Perot interference filter portions along the reference line; and a light detection unit configured to detect light transmitted through each of the plurality of Fabry-Perot interference filter portions along the reference line, wherein the wafer support unit has a light passage region through which light is allowed to pass along the reference line.

2. The optical inspection device according to claim 1, wherein the wafer support unit has an opening as the light passage region, the opening faces an effective area of the wafer, the plurality of Fabry-Perot interference filter portions are formed in the effective area.

3. The optical inspection device according to claim 1, wherein the wafer support unit has a light transmitting member as the light passage region, the light transmitting member comes in contact with an effective area of the wafer, the plurality of Fabry-Perot interference filter portions are formed in the effective area.

4. The optical inspection device according to claim 1, further comprising a voltage application unit configured to apply a voltage to each of the plurality of Fabry-Perot interference filter portions so as to change the distance between the first mirror portion and the second mirror portion facing each other.

5. The optical inspection device according to claim 4, wherein the light emission unit is configured to simultaneously emit light with a plurality of wavelengths, and the light detection unit is configured to detect the light with the plurality of wavelengths, for each of the wavelengths.

6. The optical inspection device according to claim 4, wherein the light emission unit is configured to emit light with a plurality of wavelengths, for each of the wavelengths, and the light detection unit is configured to have sensitivity to the light with the plurality of wavelengths.

7. The optical inspection device according to claim 1, further comprising an imaging unit configured to image the wafer supported by the wafer support unit.

8. An optical inspection method comprising:

a step of preparing a wafer including a substrate layer and a plurality of Fabry-Perot interference filter portions two-dimensionally arranged on the substrate layer, each of the plurality of Fabry-Perot interference filter portions of the wafer being an uncut Fabry-Perot interference filter having a first mirror portion and a second mirror portion facing each other with a gap formed between the first mirror portion and the second mirror portion facing each other and a distance between the first mirror portion and the second mirror portion facing each other varying by an electrostatic force;

a step of emitting light to be incident on each of the plurality of Fabry-Perot interference filter portions along a direction in which the first mirror portion and the second mirror portion face each other; and a step of detecting light transmitted through each of the plurality of Fabry-Perot interference filter portions along the direction in which the first mirror portion and the second mirror portion face each other.

9. The optical inspection method according to claim 8, further comprising a step of applying a voltage to each of the plurality of Fabry-Perot interference filter portions so as to change the distance between the first mirror portion and the second mirror portion facing each other.

10. The optical inspection method according to claim 8, further comprising a step of imaging the wafer.

* * * * *